US012267667B2

(12) United States Patent
Arya et al.

(10) Patent No.: US 12,267,667 B2
(45) Date of Patent: Apr. 1, 2025

(54) LOW LATENCY, LOW POWER MULTI-CHANNEL AUDIO PROCESSING

(71) Applicant: Snap Inc., Santa Monica, CA (US)

(72) Inventors: Ashwani Arya, Cypress, CA (US); Tejas Bahulkar, Sunnyvale, CA (US); Daniel Harris, San Francisco, CA (US); Daniel C. Wiggins, Port Hueneme, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 18/663,400

(22) Filed: May 14, 2024

(65) Prior Publication Data

US 2024/0298138 A1 Sep. 5, 2024

Related U.S. Application Data

(63) Continuation of application No. 17/743,045, filed on May 12, 2022, now Pat. No. 12,010,505.

(Continued)

(51) Int. Cl.

*H04S 7/00* (2006.01)
*G10L 19/008* (2013.01)

(Continued)

(52) U.S. Cl.

CPC ............ *H04S 7/304* (2013.01); *G10L 19/008* (2013.01); *H04R 5/033* (2013.01); *H04S 3/008* (2013.01);

(Continued)

(58) Field of Classification Search

None

See application file for complete search history.

(56) References Cited

U.S. PATENT DOCUMENTS

| | | | |
|---|---|---|---|
| 12,010,505 | B2 | 6/2024 | Arya et al. |
| 2017/0156015 | A1 | 6/2017 | Stockhammer |
| 2018/0091917 | A1 | 3/2018 | Chon et al. |

FOREIGN PATENT DOCUMENTS

WO WO-2019193244 A1 * 10/2019 ............ G06F 3/165

OTHER PUBLICATIONS

International Search Report and Written Opinion for International Application No. PCT/US2022/029001, dated Sep. 9, 2022 (Sep. 9, 2022)—14 pages.

(Continued)

*Primary Examiner* — Kenny H Truong

(74) *Attorney, Agent, or Firm* — CM Law; Stephen J. Weed

(57) ABSTRACT

An electronic eyewear device includes a display and a speaker system adapted to present augment reality objects and associated sounds in a scene being viewed by the user. A processor receives one or more audio tracks respectively associated with one or more augmented reality objects, encodes the audio tracks into an aggregated audio track including the audio tracks, a header for each audio track that uniquely identifies each respective audio track, and an aggregate header that identifies the number of tracks in the aggregated audio track. The processor transfers the aggregated audio track to an audio processor that uses the header for each audio track and the aggregate header to separate the audio tracks from the aggregated audio track. The audio processor processes the audio tracks independently in parallel and provides the audio tracks to the speaker system for presentation with the augmented reality objects.

20 Claims, 20 Drawing Sheets

Related U.S. Application Data

(60) Provisional application No. 63/190,733, filed on May 19, 2021.

(51) Int. Cl.
*H04R 5/033* (2006.01)
*H04S 3/00* (2006.01)

(52) U.S. Cl.
CPC ....... *H04S 2400/01* (2013.01); *H04S 2420/01* (2013.01)

(56) References Cited

OTHER PUBLICATIONS

Shiao-Li Tsao et al: "Performance Evaluation of Inter-Processor Communication for an Embedded Heterogeneous Multi-Core Processor", Journal of Information Science and Engineering, vol. 28, Jan. 1, 2012 (Jan. 1, 2012), pp. 537-554.

* cited by examiner

LOW LATENCY, LOW POWER MULTI-CHANNEL AUDIO PROCESSING

CROSS-REFERENCE TO RELATED APPLICATIONS

This application is a continuation of U.S. patent application Ser. No. 17/743,045 filed on May 12, 2022, which claims priority to U.S. Provisional Application Ser. No. 63/190,733 filed on May 19, 2021, the contents of each are incorporated fully herein by reference.

TECHNICAL FIELD

Examples set forth in the present disclosure relate to the field of audio signal processing. More particularly, but not by way of limitation, the present disclosure describes a system and method for low latency, low power multi-channel audio processing for efficiently processing audio signals corresponding to virtual objects.

BACKGROUND

A head-related transfer function (HRTF) is a response that characterizes how an ear of a user receives a sound from a point in space. As sound strikes the user, the size and shape of the head, ears, ear canal, the density of the head, and the size and shape of nasal and oral cavities, transform the sound and affect how it is perceived by boosting some frequencies and attenuating others.

A pair of HRTFs, one for each ear, can be used to synthesize a binaural sound that seems to come from a particular point in space. Each transfer function describes how a sound from a specific point will arrive at a respective ear (e.g., at the outer end of the auditory canal). Delays in processing of the spatial audio data due to latency may adversely affect the quality of the reproduced sound.

BRIEF DESCRIPTION OF THE DRAWINGS

Features of the various examples described will be readily understood from the following detailed description, in which reference is made to the figures. A reference numeral is used with each element in the description and throughout the several views of the drawing. When a plurality of similar elements is present, a single reference numeral may be assigned to like elements, with an added lower-case letter referring to a specific element.

The various elements shown in the figures are not drawn to scale unless otherwise indicated. The dimensions of the various elements may be enlarged or reduced in the interest of clarity. The several figures depict one or more implementations and are presented by way of example only and should not be construed as limiting. Included in the drawing are the following figures.

DETAILED DESCRIPTION

Figure 1A:
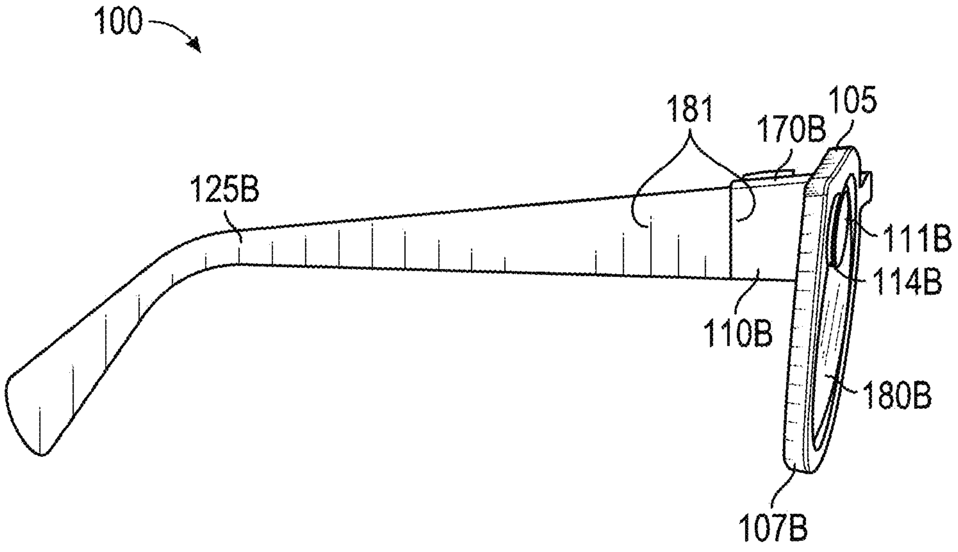
FIG. 1A is a side view (right) of an example hardware configuration of an eyewear device suitable adapted to include an audio system including an HRTF modeling system.

An electronic eyewear device may immerse a user in an augmented reality environment where a large variable number of concurrent augmented reality objects (e.g., virtual lens objects) move around in a physical space. Each of these augmented reality objects may be associated with an audio track that is expected to correspondingly 'move' with the augmented reality object using independent spatial audio post processing. To achieve a low power, low audio playback latency without bounding the number of concurrent tracks, the post-processing may be offloaded to an audio co-processor. For optimal latency performance, the number of remote procedure calls between the host processor and audio co-processor should be minimized. The techniques described herein limit the remote procedure calls by defining a new audio data format and associated encoding and decoding methods for transferring multiple channels of audio tracks to the audio co-processor in a single frame for multi-channel audio processing.

In conventional HRTF modeling, the current position of any sound is captured using multiple fast Fourier transforms (FFTs) to generate the HRTF, and then long-tail (e.g., 256 or more sample) finite impulse response filters (FIRs) are used to implement the HRTF. Such conventional techniques are computationally expensive. In sample configurations, the processing of the audio samples is made less computationally expensive by implementing a head-related transfer function (HRTF) model that breaks down the space surrounding the user (also referred to herein as listener) into 36 zones, each with a fixed set of predetermined filters (e.g., biquad filters) requiring fewer calculations than conventional HRTF models. As a sound object moves from zone to zone, the new zone's pre-determined filters are applied. This results in a complexity reduction of approximately 2 orders of magnitude over conventional techniques, thereby decreasing the overall computational load for the HRTF model and allowing for more simultaneous objects to be calculated and transformed.

This disclosure is thus directed to a system and method for presenting augmented reality objects and associated sounds in a scene being viewed by a user using an electronic eyewear device. The electronic eyewear device includes a display and a speaker system adapted to present the augment reality objects and associated sounds in the scene. A host processor receives one or more audio tracks respectively associated with one or more augmented reality objects, encodes the audio tracks into an aggregated audio track including the audio tracks, a header for each audio track that uniquely identifies each respective audio track, and an aggregate header that identifies the number of tracks in the aggregated audio track. The host processor transfers the aggregated audio track to an audio co-processor that uses the header for each audio track and the aggregate header to separate the audio tracks from the aggregated audio track. The audio co-processor processes the audio tracks independently in parallel and provides the audio tracks to the speaker system for presentation with the augmented reality objects. The resulting system and method provide a low power, low audio playback latency without limiting the number of concurrent audio tracks, and hence without limiting the number of augmented reality objects that may be displayed in the scene with associated sounds.

The following detailed description includes systems, methods, techniques, instruction sequences, and computing machine program products illustrative of examples set forth in the disclosure. Numerous details and examples are included for the purpose of providing a thorough understanding of the disclosed subject matter and its relevant teachings. Those skilled in the relevant art, however, may understand how to apply the relevant teachings without such details. Aspects of the disclosed subject matter are not limited to the specific devices, systems, and method described because the relevant teachings can be applied or practice in a variety of ways. The terminology and nomenclature used herein is for the purpose of describing particular aspects only and is not intended to be limiting. In general, well-known instruction instances, protocols, structures, and techniques are not necessarily shown in detail.

The terms "coupled" or "connected" as used herein refer to any logical, optical, physical, or electrical connection, including a link or the like by which the electrical or magnetic signals produced or supplied by one system element are imparted to another coupled or connected system element. Unless described otherwise, coupled or connected elements or devices are not necessarily directly connected to one another and may be separated by intermediate components, elements, or communication media, one or more of which may modify, manipulate, or carry the electrical signals. The term "on" means directly supported by an element or indirectly supported by the element through another element that is integrated into or supported by the element.

The term "proximal" is used to describe an item or part of an item that is situated near, adjacent, or next to an object or person; or that is closer relative to other parts of the item, which may be described as "distal." For example, the end of an item nearest an object may be referred to as the proximal end, whereas the generally opposing end may be referred to as the distal end.

The orientations of the eyewear device, other mobile devices, associated components, and any other devices incorporating a camera, an inertial measurement unit, or both such as shown in any of the drawings, are given by way of example only, for illustration and discussion purposes. In operation, the eyewear device may be oriented in any other direction suitable to the particular application of the eyewear device; for example, up, down, sideways, or any other orientation. Also, to the extent used herein, any directional term, such as front, rear, inward, outward, toward, left, right, lateral, longitudinal, up, down, upper, lower, top, bottom, side, horizontal, vertical, and diagonal are used by way of example only, and are not limiting as to the direction or orientation of any camera or inertial measurement unit as constructed or as otherwise described herein.

In sample configurations, advanced augmented reality (AR) technologies, such as computer vision and object tracking, may be used to produce a perceptually enriched and immersive experience. Computer vision algorithms extract three-dimensional data about the physical world from the data captured in digital images or video. Object recognition and tracking algorithms may be used to detect an object in a digital image or video, estimate its orientation or pose (e.g., six degrees of freedom; x, y, z, pitch, yaw, roll), and track its movement over time. As used herein, the term "pose" refers to the static position and orientation of an object at a particular instant in time. The term "gesture" refers to the active movement of an object, such as a hand, through a series of poses, sometimes to convey a signal or idea. The terms, pose and gesture, are sometimes used interchangeably in the field of computer vision and augmented reality. As used herein, the terms "pose" or "gesture" (or variations thereof) are intended to be inclusive of both poses and gestures; in other words, the use of one term does not exclude the other.

Additional objects, advantages and novel features of the examples will be set forth in part in the following description, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

Reference now is made in detail to the examples illustrated in the accompanying drawings and discussed below.

FIG. 1A is a side view (right) of an example hardware configuration of an eyewear device 100 which includes a touch-sensitive input device or touchpad 181. As shown, the touchpad 181 may have a boundary that is subtle and not easily seen; alternatively, the boundary may be plainly visible or include a raised or otherwise tactile edge that provides feedback to the user about the location and boundary of the touchpad 181. In other implementations, the eyewear device 100 may include a touchpad on the left side instead of or in addition to touchpad 181.

The surface of the touchpad 181 is configured to detect finger touches, taps, and gestures (e.g., moving touches) for use with a GUI displayed by the eyewear device, on an image display, to allow the user to navigate through and select menu options in an intuitive manner, which enhances and simplifies the user experience.

Detection of finger inputs on the touchpad 181 can enable several functions. For example, touching anywhere on the touchpad 181 may cause the GUI to display or highlight an item on the image display, which may be projected onto at least one of the optical assemblies 180A, 180B. Double tapping on the touchpad 181 may select an item or icon. Sliding or swiping a finger in a particular direction (e.g., from front to back, back to front, up to down, or down to) may cause the items or icons to slide or scroll in a particular direction; for example, to move to a next item, icon, video, image, page, or slide. Sliding the finger in another direction may slide or scroll in the opposite direction; for example, to move to a previous item, icon, video, image, page, or slide. The touchpad 181 can be virtually anywhere on the eyewear device 100.

In one example, an identified finger gesture of a single tap on the touchpad 181, initiates selection or pressing of a GUI element in the image presented on the image display of the left optical assembly 180A and right optical assembly 180B. An adjustment to the image presented on the image display of the optical assembly 180A, 180B based on the identified finger gesture can be a primary action which selects or submits the GUI element on the image display of the optical assembly 180A, 180B for further display or execution.

Figure 1B:
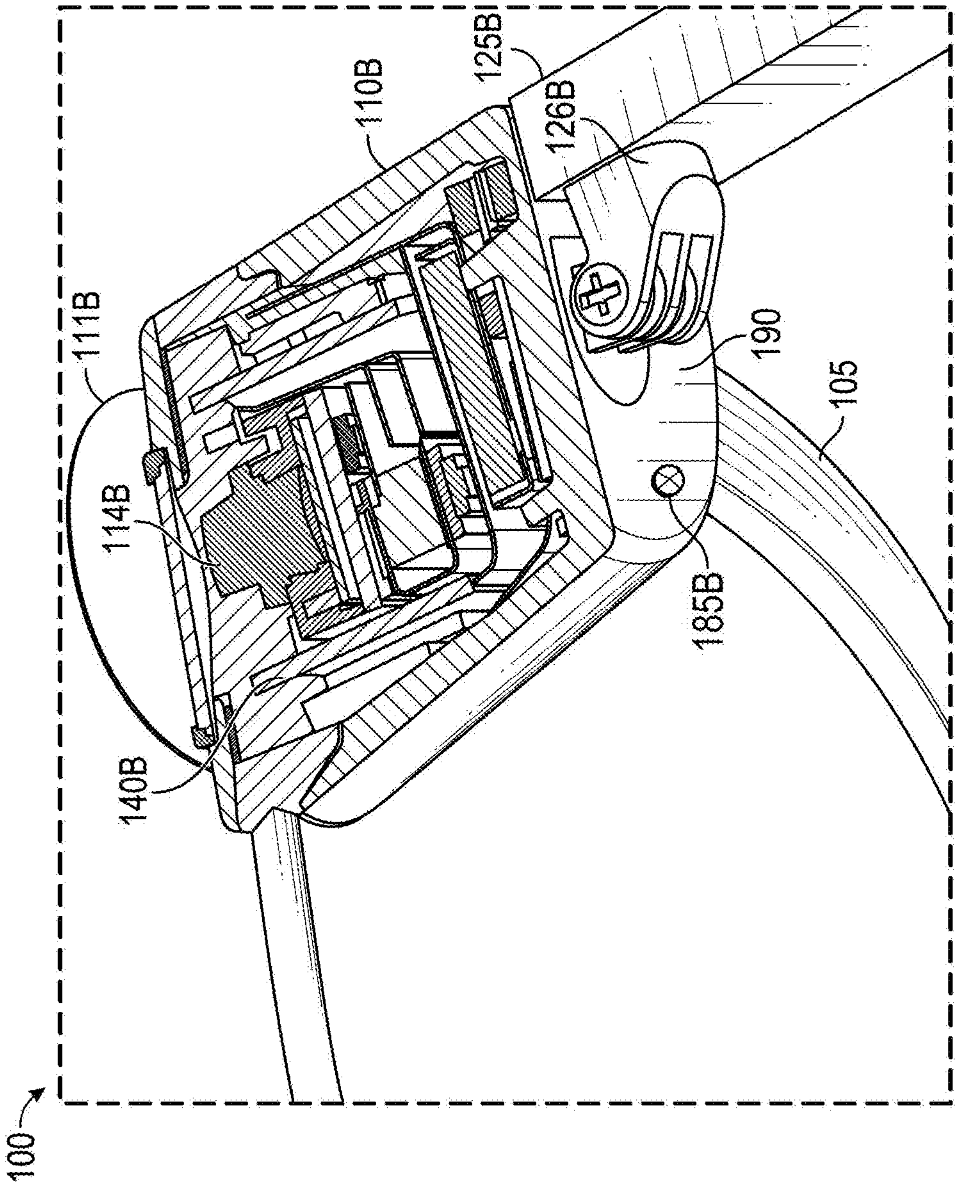
FIG. 1B is a perspective, partly sectional view of a right corner of the eyewear device of FIG. 1A depicting a right visible-light camera and a circuit board.
Figure 1C:
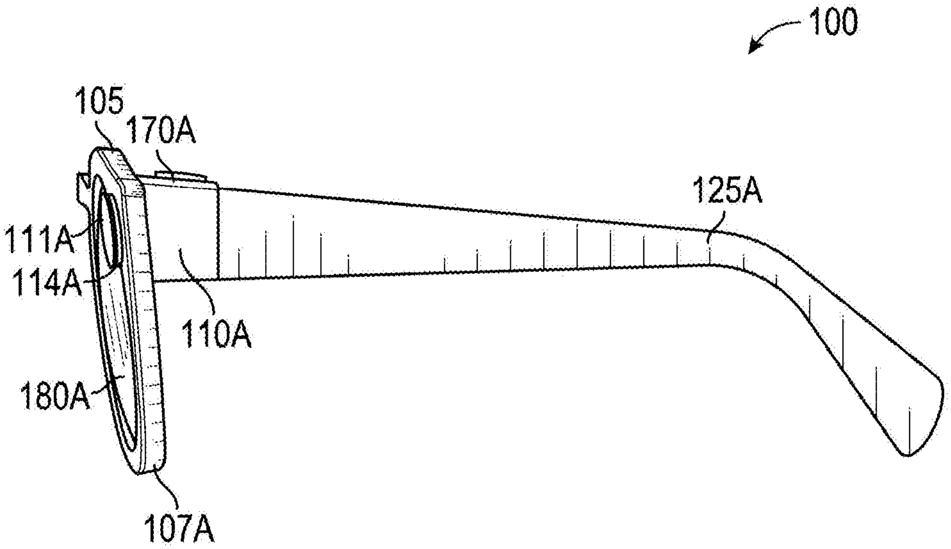
FIG. 1C is a side view (left) of an example hardware configuration of the eyewear device of FIG. 1A, which shows a left visible-light camera.
Figure 1D:
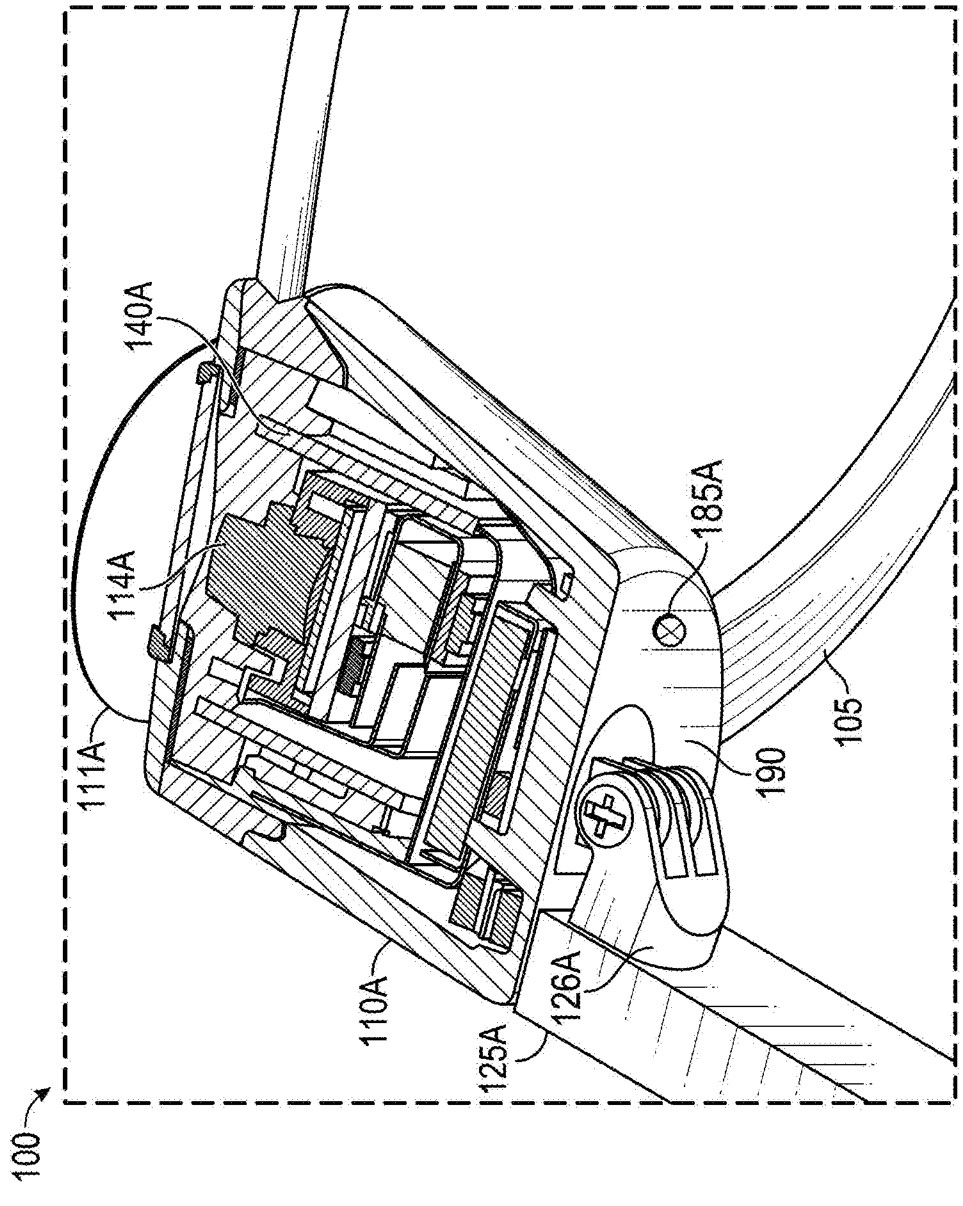
FIG. 1D is a perspective, partly sectional view of a left corner of the eyewear device of FIG. 1C depicting the left visible-light camera and a circuit board.

The eyewear device 100 includes a right optical assembly 180B with an image display to present images, such as depth images. As shown in FIGS. 1A and 1B, the eyewear device 100 includes the right visible-light camera 114B. The eyewear device 100 can include multiple visible-light cameras 114A, 114B that form a passive type of three-dimensional camera, such as a stereo camera, of which the right visible-light camera 114B is located on a right corner 110B. As shown in FIGS. 1C-D, the eyewear device 100 also includes a left visible-light camera 114A. As further described herein, left visible-light camera 114A and right visible-light camera 114B capture image information for a scene from two separate viewpoints. The two captured images may be used to project a three-dimensional display onto an image display for viewing with three-dimensional (3D) glasses or the displays of augmented reality or virtual reality eyewear devices.

Figure 3:
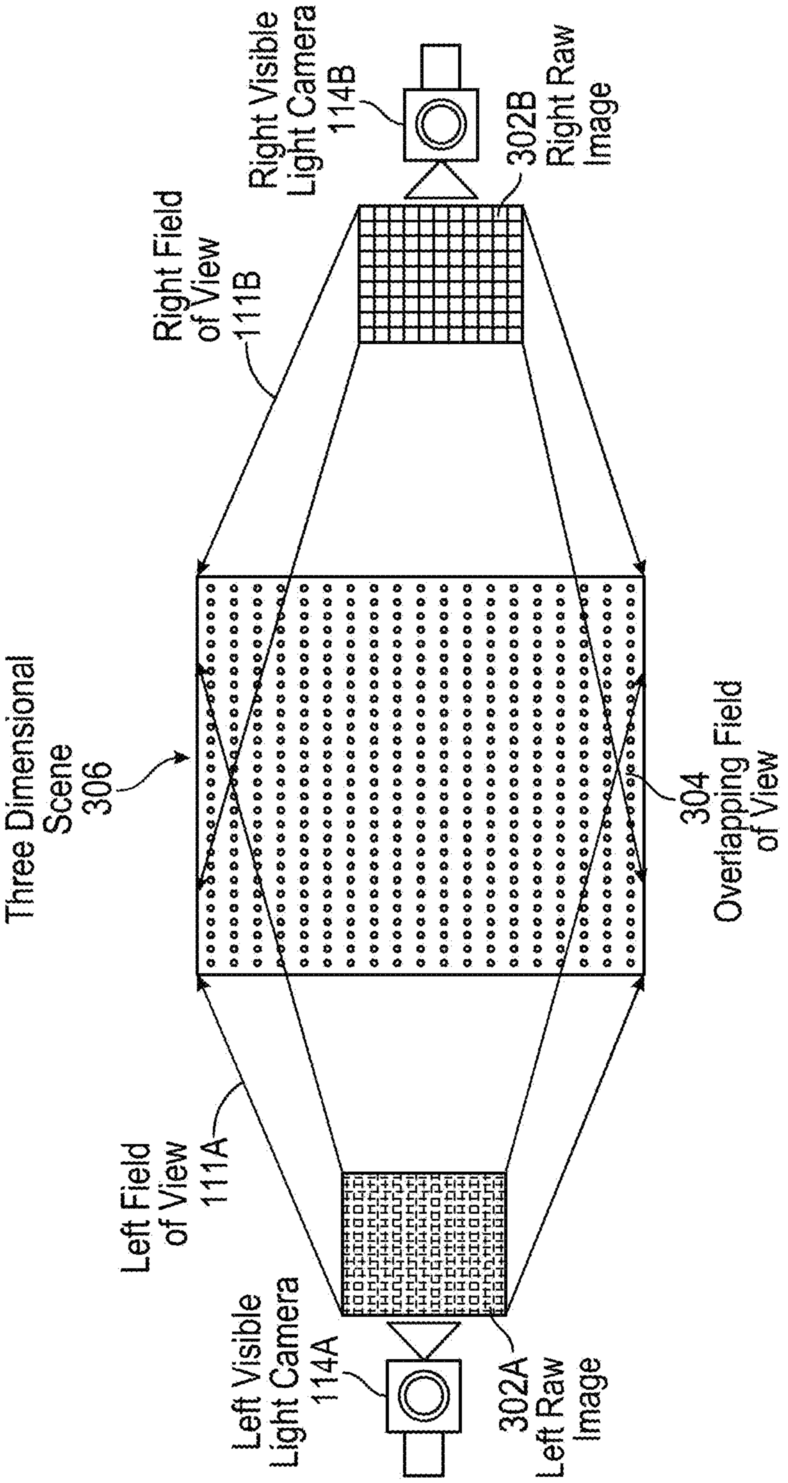
FIG. 3 is a diagrammatic depiction of a three-dimensional scene, a left raw image captured by a left visible-light camera, and a right raw image captured by a right visible-light camera.

Left and right visible-light cameras 114A, 114B are sensitive to the visible-light range wavelength. Each of the visible-light cameras 114A, 114B have a different frontward facing field of view which are overlapping to enable generation of three-dimensional depth images, for example, right visible-light camera 114B depicts a right field of view 111B. Generally, a "field of view" is the part of the scene that is visible through the camera at a particular position and orientation in space. The fields of view 111A and 111B have an overlapping field of view 304 (FIG. 3). Objects or object features outside the field of view 111A, 111B when the visible-light camera captures the image are not recorded in a raw image (e.g., photograph or picture). The field of view describes an angle range or extent in which the image sensor of the visible-light camera 114A, 114B picks up electromagnetic radiation of a given scene in a captured image of the given scene. Field of view can be expressed as the angular size of the view cone; i.e., an angle of view. The angle of view can be measured horizontally, vertically, or diagonally.

In an example configuration, one or both visible-light cameras 114A, 114B has a field of view of 100° and a resolution of 480×480 pixels. The "angle of coverage" describes the angle range that a lens of visible-light cameras 114A, 114B or infrared camera 410 (see FIG. 4) can effectively image. Typically, the camera lens produces an image circle that is large enough to cover the film or sensor of the camera completely, possibly including some vignetting (e.g., a darkening of the image toward the edges when compared to the center). If the angle of coverage of the camera lens does not fill the sensor, the image circle will be visible, typically with strong vignetting toward the edge, and the effective angle of view will be limited to the angle of coverage.

Examples of such visible-light cameras 114A, 114B include a high-resolution complementary metal-oxide-semiconductor (CMOS) image sensor and a digital VGA camera (video graphics array) capable of resolutions of 480p (e.g., 640×480 pixels), 720p, 1080p, or greater. Other examples include visible-light cameras 114A, 114B that can capture high-definition (HD) video at a high frame rate (e.g., thirty to sixty frames per second, or more) and store the recording at a resolution of 1216 by 1216 pixels (or greater).

The eyewear device 100 may capture image sensor data from the visible-light cameras 114A, 114B along with geolocation data, digitized by an image processor 412, for storage in a memory. The visible-light cameras 114A, 114B capture respective left and right raw images in the two-dimensional space domain that comprise a matrix of pixels on a two-dimensional coordinate system that includes an X-axis for horizontal position and a Y-axis for vertical position. Each pixel includes a color attribute value (e.g., a red pixel light value, a green pixel light value, or a blue pixel light value); and a position attribute (e.g., an X-axis coordinate and a Y-axis coordinate).

In order to capture stereo images for later display as a three-dimensional projection, the image processor 412 (shown in FIG. 4) may be coupled to the visible-light cameras 114A, 114B to receive and store the visual image information. The image processor 412, or another processor, controls operation of the visible-light cameras 114A, 114B to act as a stereo camera simulating human binocular vision and may add a timestamp to each image. The timestamp on each pair of images allows display of the images together as part of a three-dimensional projection. Three-dimensional projections produce an immersive, life-like experience that is desirable in a variety of contexts, including virtual reality (VR) and video gaming.

The eyewear device 100 additionally has a stereo speaker system including a left speaker 185A (FIG. 1D) for presenting audio signals to a left ear of wearer and a right speaker 185B (FIG. 1B) for presenting audio signals to a right ear of the wearer. An audio processor 413 (FIG. 4) of the stereo speaker system delivers audio signals to the left speaker 185A and the right speaker 185B.

FIG. 1B is a perspective, cross-sectional view of a right corner 110B of the eyewear device 100 of FIG. 1A depicting the right visible-light camera 114B of the camera system and a circuit board 140B. FIG. 1C is a side view (left) of an example hardware configuration of an eyewear device 100 of FIG. 1A, which shows a left visible-light camera 114A of the camera system. FIG. 1D is a perspective, cross-sectional view of a left corner 110A of the eyewear device of FIG. 1C depicting the left visible-light camera 114A of the camera system, and a circuit board 140A.

Construction and placement of the left visible-light camera 114A is substantially similar to the right visible-light camera 114B, except the connections and coupling are on the left lateral side 170A rather than the right lateral side 170B. As shown in the example of FIG. 1B, the eyewear device 100 includes the right visible-light camera 114B and a right circuit board 140B, which may be a flexible printed circuit board (PCB). A right hinge 126B connects the right corner 110B to a right temple 125B of the eyewear device 100. In some examples, components of the right visible-light camera 114B, the flexible PCB 140B, or other electrical connectors or contacts may be located on the right temple 125B or the right hinge 126B. As shown in FIG. 1D, a left hinge 126A connects the left corner 110A to a left temple 125A of the eyewear device 100. In some examples, components of the left visible-light camera 114A, the flexible PCB 140A, or other electrical connectors or contacts may be located on the left temple 125A or the left hinge 126A.

The right corner 110B includes corner body 190 and a corner cap, with the corner cap omitted in the cross-section of FIG. 1B. Disposed inside the right corner 110B are various interconnected circuit boards, such as PCBs or flexible PCBs, that include controller circuits for right visible-light camera 114B, right speaker 185B, microphone (s), low-power wireless circuitry (e.g., for wireless short range network communication via BLUETOOTH®), high-speed wireless circuitry (e.g., for wireless local area network communication via WI-FI®).

Figure 2A:
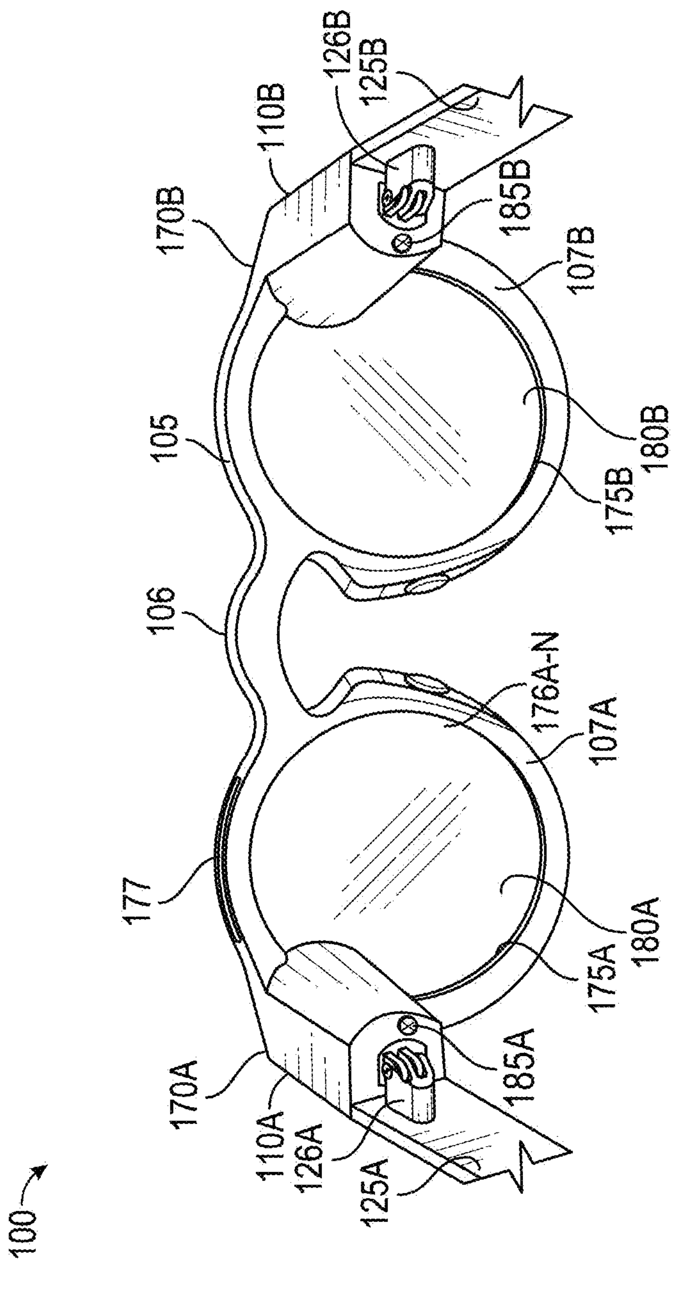
FIGS. 2A and 2B are rear views of example hardware configurations of an eyewear device adapted to include an audio system including the HRTF modeling system.

The right visible-light camera 114B is coupled to or disposed on the flexible PCB 140B and covered by a visible-light camera cover lens, which is aimed through opening(s) formed in the frame 105. For example, the right rim 107B of the frame 105, shown in FIG. 2A, is connected to the right corner 110B and includes the opening(s) for the visible-light camera cover lens. The frame 105 includes a front side configured to face outward and away from the eye of the user. The opening for the visible-light camera cover lens is formed on and through the front or outward-facing side of the frame 105. In the example, the right visible-light camera 114B has an outward-facing field of view 111B (shown in FIG. 3) with a line of sight or perspective that is correlated with the right eye of the user of the eyewear device 100. The visible-light camera cover lens can also be adhered to a front side or outward-facing surface of the right corner 110B in which an opening is formed with an outward-facing angle of coverage, but in a different outwardly direction. The coupling can also be indirect via intervening components.

As shown in FIG. 1B, flexible PCB 140B is disposed inside the right corner 110B and is coupled to one or more other components housed in the right corner 110B. Although shown as being formed on the circuit boards of the right corner 110B, the right visible-light camera 114B can be formed on the circuit boards of the left corner 110A, the temples 125A, 125B, or the frame 105.

Figure 2B:
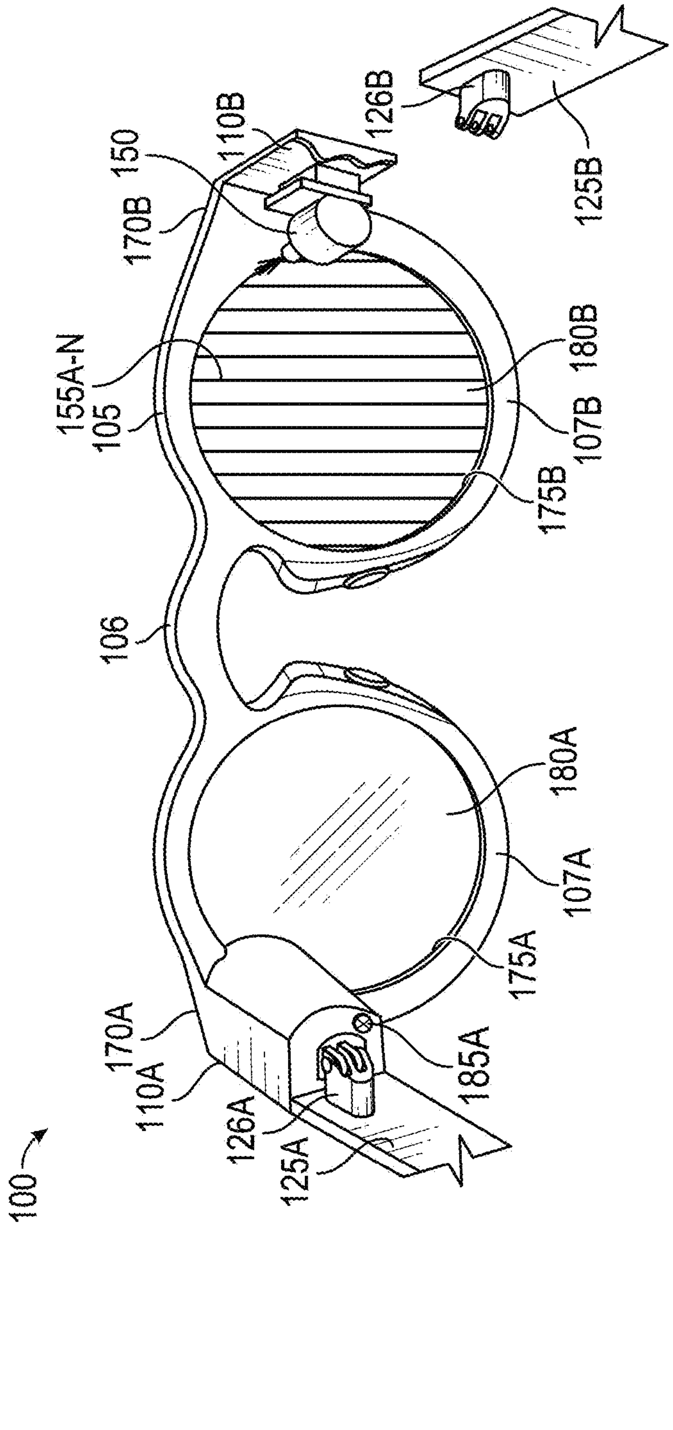

FIGS. 2A and 2B are perspective views, from the rear, of example hardware configurations of the eyewear device 100, including two different types of image displays. The eyewear device 100 is sized and shaped in a form configured for wearing by a user; the form of eyeglasses is shown in the example. The eyewear device 100 can take other forms and may incorporate other types of frameworks; for example, a headgear, a headset, or a helmet.

In the eyeglasses example, eyewear device 100 includes a frame 105 including a left rim 107A connected to a right rim 107B via a bridge 106 adapted to be supported by a nose of the user. The left and right rims 107A, 107B include respective apertures 175A, 175B, which hold a respective optical element 180A, 180B, such as a lens and a display device. As used herein, the term "lens" is meant to include transparent or translucent pieces of glass or plastic having curved or flat surfaces that cause light to converge or diverge or that cause little or no convergence or divergence.

Although shown as having two optical elements 180A, 180B, the eyewear device 100 can include other arrangements, such as a single optical element (or it may not include any optical element 180A, 180B), depending on the application or the intended user of the eyewear device 100. As further shown, eyewear device 100 includes a left corner 110A adjacent the left lateral side 170A of the frame 105 and a right corner 110B adjacent the right lateral side 170B of the frame 105. The corners 110A, 110B may be integrated into the frame 105 on the respective sides 170A, 170B (as illustrated) or implemented as separate components attached to the frame 105 on the respective sides 170A, 170B. Alternatively, the corners 110A, 110B may be integrated into temples (not shown) attached to the frame 105.

In one example, the image display of optical assembly 180A, 180B includes an integrated image display. As shown in FIG. 2A, each optical assembly 180A, 180B includes a suitable display matrix 177, such as a liquid crystal display (LCD), an organic light-emitting diode (OLED) display, or any other such display. Each optical assembly 180A, 180B also includes an optical layer or layers 176, which can include lenses, optical coatings, prisms, mirrors, waveguides, optical strips, and other optical components in any combination. The optical layers 176A, 176B, . . . 176N (shown as 176A-N in FIG. 2A and herein) can include a prism having a suitable size and configuration and including a first surface for receiving light from a display matrix and a second surface for emitting light toward the eye of the user. The prism of the optical layers 176A-N extends over all or at least a portion of the respective apertures 175A, 175B formed in the left and right rims 107A, 107B to permit the user to see the second surface of the prism when the eye of the user is viewing through the corresponding left and right rims 107A, 107B. The first surface of the prism of the optical layers 176A-N faces upwardly from the frame 105 and the display matrix 177 overlies the prism so that photons and light emitted by the display matrix 177 impinge the first surface. The prism is sized and shaped so that the light is refracted within the prism and is directed toward the eye of the user by the second surface of the prism of the optical layers 176A-N. In this regard, the second surface of the prism of the optical layers 176A-N can be convex to direct the light toward the center of the eye. The prism can optionally be sized and shaped to magnify the image projected by the display matrix 177, and the light travels through the prism so that the image viewed from the second surface is larger in one or more dimensions than the image emitted from the display matrix 177.

In one example, the optical layers 176A-N may include an LCD layer that is transparent (keeping the lens open) unless and until a voltage is applied which makes the layer opaque (closing or blocking the lens). The image processor 412 on the eyewear device 100 may execute programming to apply the voltage to the LCD layer in order to produce an active shutter system, making the eyewear device 100 suitable for viewing visual content when displayed as a three-dimensional projection. Technologies other than LCD may be used for the active shutter mode, including other types of reactive layers that are responsive to a voltage or another type of input.

In another example, the image display device of optical assembly 180A, 180B includes a projection image display as shown in FIG. 2B. Each optical assembly 180A, 180B includes a laser projector 150, which is a three-color laser projector using a scanning mirror or galvanometer. During operation, an optical source such as a laser projector 150 is disposed in or on one of the temples 125A, 125B of the eyewear device 100. Optical assembly 180B in this example includes one or more optical strips 155A, 155B, . . . 155N (shown as 155A-N in FIG. 2B) which are spaced apart and across the width of the lens of each optical assembly 180A, 180B or across a depth of the lens between the front surface and the rear surface of the lens.

As the photons projected by the laser projector 150 travel across the lens of each optical assembly 180A, 180B, the photons encounter the optical strips 155A-N. When a particular photon encounters a particular optical strip, the photon is either redirected toward the user's eye, or it passes to the next optical strip. A combination of modulation of laser projector 150, and modulation of optical strips, control specific photons or beams of light. In an example, a processor controls optical strips 155A-N by initiating mechanical, acoustic, or electromagnetic signals. Although shown as having two optical assemblies 180A, 180B, the eyewear device 100 can include other arrangements, such as a single or three optical assemblies, or each optical assembly 180A, 180B may have arranged different arrangement depending on the application or intended user of the eyewear device 100.

In another example, the eyewear device 100 shown in FIG. 2B may include two projectors, a left projector (not shown) and a right projector 150. The left optical assembly 180A may include a left display matrix 177A (not shown) or a left set of optical strips (not shown) which are configured to interact with light from the left projector. Similarly, the right optical assembly 180B may include a right display matrix 177B (not shown) or a right set of optical strips which are configured to interact with light from the right projector 150. In this example, the eyewear device 100 includes a left display and a right display.

FIG. 3 is a diagrammatic depiction of a three-dimensional (3D) scene 306, a left raw image 302A captured by a left visible-light camera 114A, and a right raw image 302B captured by a right visible-light camera 114B. The left field of view 111A may overlap, as shown, with the right field of view 111B. The overlapping field of view 304 represents that portion of the image captured by both cameras 114A, 114B. The term 'overlapping' when referring to field of view means the matrix of pixels in the generated raw images overlap by thirty percent (30%) or more. 'Substantially overlapping' means the matrix of pixels in the generated raw images—or in the infrared image of scene—overlap by fifty percent (50%) or more. As described herein, the two raw images 302A, 302B may be processed to include a timestamp, which allows the images to be displayed together as part of a three-dimensional projection.

For the capture of stereo images, as illustrated in FIG. 3, a pair of raw red, green, and blue (RGB) images are captured of a real scene 306 at a given moment in time—a left raw image 302A captured by the left camera 114A and right raw image 302B captured by the right camera 114B. When the pair of raw images 302A, 302B are processed (e.g., by the image processor 412), depth images are generated. The generated depth images may be viewed on an optical assembly 180A, 180B of an eyewear device, on another display (e.g., the image display 580 on a mobile device 401), or on a screen.

In one example, the generated depth images are in the two-dimensional or three-dimensional space domain and can comprise a matrix of vertices on a multi-dimensional location coordinate system that includes an X axis for horizontal position (e.g., length), a Y axis for vertical position (e.g., height), and, optionally, a Z axis for depth (e.g., distance). Each vertex may include a color attribute (e.g., a red pixel light value, a green pixel light value, or a blue pixel light value); a position attribute (e.g., an X location coordinate, a Y location coordinate, and optionally a Z location coordinate); a texture attribute; a reflectance attribute; or a combination thereof. The texture attribute quantifies the perceived texture of the depth image, such as the spatial arrangement of color or intensities in a region of vertices of the depth image.

In one example, the HRTF modeling system 400 (FIG. 4) includes the eyewear device 100, which includes a frame 105 and a left temple 125A extending from a left lateral side 170A of the frame 105 and a right temple 125B extending from a right lateral side 170B of the frame 105. The eyewear device 100 may further include at least two visible-light cameras 114A, 114B having overlapping fields of view. In one example, the eyewear device 100 includes a left visible-light camera 114A with a left field of view 111A, as illustrated in FIG. 3. The left camera 114A is connected to the frame 105 or the left temple 125A to capture a left raw image 302A from the left side of scene 306. The eyewear device 100 further includes a right visible-light camera 114B with a right field of view 111B. The right camera 114B is connected to the frame 105 or the right temple 125B to capture a right raw image 302B from the right side of scene 306.

Figure 4:
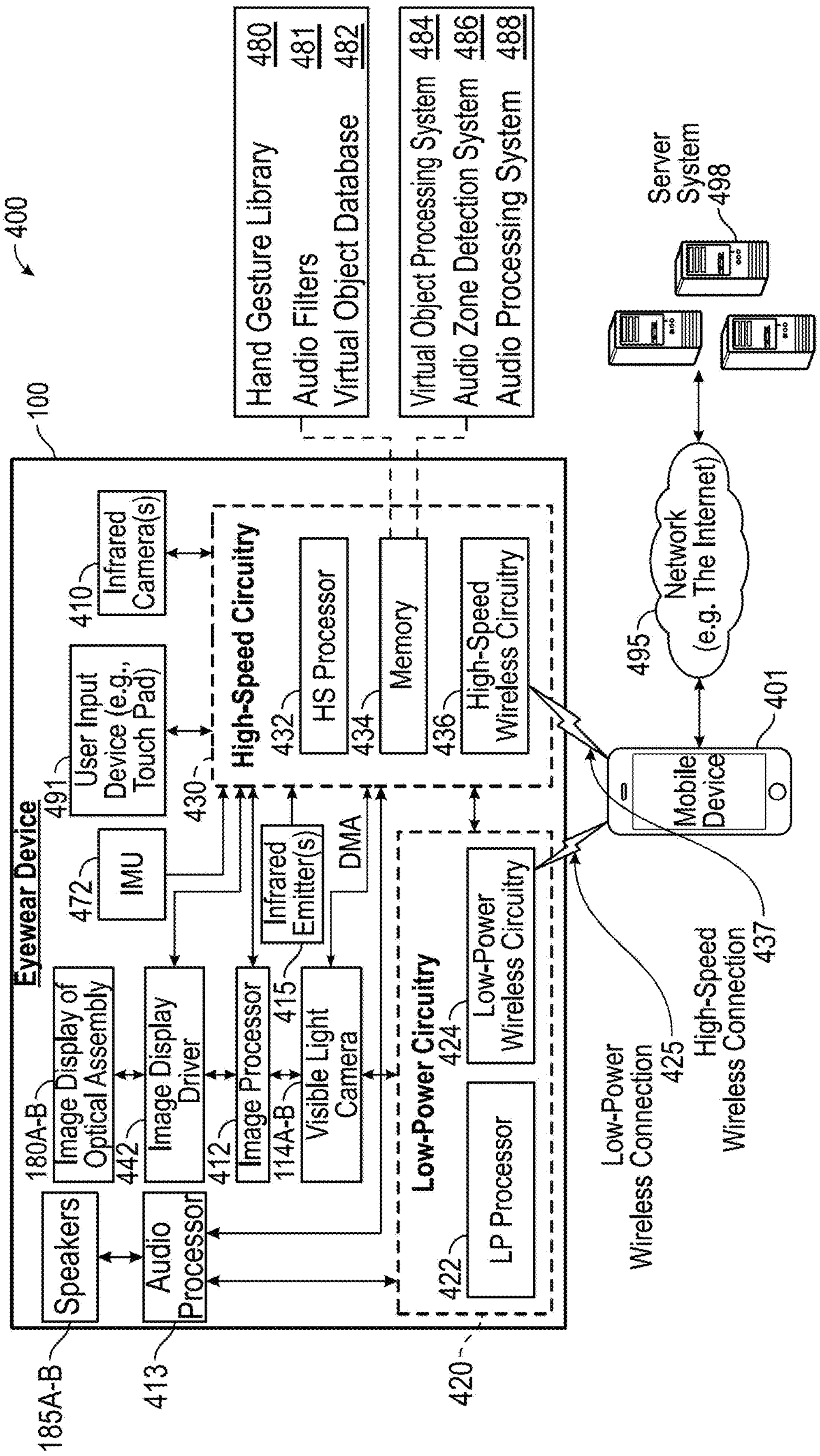
FIG. 4 is a functional block diagram of an example audio system including an HRTF modeling system including a wearable device (e.g., an eyewear device) and a server system connected via various networks.

FIG. 4 is a functional block diagram of an example HRTF modeling system 400 including a wearable device (e.g., an eyewear device 100), a mobile device 401, and a server system 498 connected via various networks 495 such as the Internet. As shown, the HRTF modeling system 400 includes a low-power wireless connection 425 and a high-speed wireless connection 437 between the eyewear device 100 and the mobile device 401.

As shown in FIG. 4, the eyewear device 100 includes one or more visible-light cameras 114A, 114B that capture still images, video images, or both still and video images, as described herein. The cameras 114A, 114B may have a direct memory access (DMA) to high-speed circuitry 430 and function as a stereo camera. The cameras 114A, 114B may be used to capture initial-depth images that may be rendered into three-dimensional (3D) models that are texture-mapped images of a red, green, and blue (RGB) imaged scene or respectively displayed on image display of optical assemblies 180A-B. The device 100 may also include a depth sensor, which uses infrared signals to estimate the position of objects relative to the device 100. The depth sensor in some examples includes one or more infrared emitter(s) 415 and infrared camera(s) 410.

The eyewear device 100 further includes two image displays of each optical assembly 180A, 180B (one associated with the left side 170A and one associated with the right side 170B). The eyewear device 100 also includes an image display driver 442, an image processor 412, low-power circuitry 420, and high-speed circuitry 430. The image displays of each optical assembly 180A, 180B are for presenting images, including still images, video images, or still and video images. The image display driver 442 is coupled to the image displays of each optical assembly 180A, 180B in order to control the display of images.

The eyewear device 100 additionally includes a pair of speakers 185A-B (e.g., one associated with the left side of the eyewear device and another associated with the right side of the eyewear device). The speakers 185A may be incorporated into the frame 105, temples 125, or corners 110 of the eyewear device 100. The speakers 185 are driven by audio processor 413 under control of low-power circuitry 420, high-speed circuitry 430, or both. The speakers 185 are for presenting audio signals including, for example, an audio track associated with a virtual object. The audio processor 413 is coupled to the speakers 185 in order to control the presentation of sound in accordance with HRTF modeling to provide acoustical position information corresponding to the location of virtual objects presented on the image displays of optical assemblies 180A-B. Audio processor 413 may be any processor capable of managing audio processing needed for eyewear device 100 (e.g., capable of HRTF modeling). As will be explained further below with respect to FIGS. 11-14, the audio processor 413 may be coupled to a high-speed processor 432 of high-speed circuitry 430 using encoding techniques that improve processing power usage and processing latency.

The components shown in FIG. 4 for the eyewear device 100 are located on one or more circuit boards, for example a printed circuit board (PCB) or flexible printed circuit (FPC), located in the rims or temples. Alternatively, or additionally, the depicted components can be located in the corners, frames, hinges, or bridge of the eyewear device 100. Left and right visible-light cameras 114A, 114B can include digital camera elements such as a complementary metal-oxide-semiconductor (CMOS) image sensor, a charge-coupled device, a lens, or any other respective visible or light capturing elements that may be used to capture data, including still images or video of scenes with unknown objects.

As shown in FIG. 4, high-speed circuitry 430 includes a high-speed processor 432, a memory 434, and high-speed wireless circuitry 436. In the example, the image display driver 442 is coupled to the high-speed circuitry 430 and operated by the high-speed processor 432 in order to drive the left and right image displays of each optical assembly 180A, 180B. High-speed processor 432 may be any processor capable of managing high-speed communications and operation of any general computing system needed for eyewear device 100. High-speed processor 432 includes processing resources needed for managing high-speed data transfers on high-speed wireless connection 437 to a wireless local area network (WLAN) using high-speed wireless circuitry 436.

In some examples, the high-speed processor 432 executes an operating system such as a LINUX operating system or other such operating system of the eyewear device 100 and the operating system is stored in memory 434 for execution. In addition to any other responsibilities, the high-speed processor 432 executes a software architecture for the eyewear device 100 that is used to manage data transfers with high-speed wireless circuitry 436. In some examples, high-speed wireless circuitry 436 is configured to implement Institute of Electrical and Electronic Engineers (IEEE) 802.11 communication standards, also referred to herein as Wi-Fi. In other examples, other high-speed communications standards may be implemented by high-speed wireless circuitry 436.

The low-power circuitry 420 includes a low-power processor 422 and low-power wireless circuitry 424. The low-power wireless circuitry 424 and the high-speed wireless circuitry 436 of the eyewear device 100 can include short-range transceivers (BLUETOOTH® or Bluetooth Low-Energy (BLE)) and wireless wide, local, or wide-area network transceivers (e.g., cellular or WI-FI®). Mobile device 401, including the transceivers communicating via the low-power wireless connection 425 and the high-speed wireless connection 437, may be implemented using details of the architecture of the eyewear device 100, as can other elements of the network 495.

Memory 434 includes any storage device capable of storing various data and applications, including, among other things, camera data generated by the left and right visible-light cameras 114A, 114B, the infrared camera(s) 410, the image processor 412, and images generated for display by the image display driver 442 on the image display of each optical assembly 180A, 180B. Although the memory 434 is shown as integrated with high-speed circuitry 430, the memory 434 in other examples may be an independent, standalone element of the eyewear device 100. In certain such examples, electrical routing lines may provide a connection through a chip that includes the high-speed processor 432 from the image processor 412 or low-power processor 422 to the memory 434. In other examples, the high-speed processor 432 may manage addressing of memory 434 such that the low-power processor 422 will boot the high-speed processor 432 any time that a read or write operation involving memory 434 is needed.

As shown in FIG. 4, the high-speed processor 432 of the eyewear device 100 can be coupled to the camera system (visible-light cameras 114A, 114B), the image display driver 442, the user input device 491, and the memory 434.

The server system 498 may be one or more computing devices as part of a service or network computing system, for example, that includes a processor, a memory, and network communication interface to communicate over the network 495 with an eyewear device 100 and a mobile device 401.

The output components of the eyewear device 100 include visual elements, such as the left and right image displays associated with each lens or optical assembly 180A, 180B as described in FIGS. 2A and 2B (e.g., a display such as a liquid crystal display (LCD), a plasma display panel (PDP), a light emitting diode (LED) display, a projector, or a waveguide). The eyewear device 100 also may include a user-facing indicator (e.g., an LED, a loudspeaker, or a vibrating actuator), or an outward-facing signal (e.g., an LED, a loudspeaker). The image displays of each optical assembly 180A, 180B are driven by the image display driver 442. The output components of the eyewear device 100 further include additional indicators such as audible elements (e.g., speakers 185A-B under control of audio processor 413), tactile components (e.g., an actuator such as a vibratory motor to generate haptic feedback), and other signal generators. For example, the device 100 may include a user-facing set of indicators, and an outward-facing set of signals. The user-facing set of indicators are configured to be seen or otherwise sensed by the user of the device 100. For example, the device 100 may include an LED display positioned so the user can see it, one or more speakers positioned to generate a sound the user can hear, or an actuator to provide haptic feedback the user can feel. The outward-facing set of signals are configured to be seen or otherwise sensed by an observer near the device 100. Similarly, the device 100 may include an LED, a loudspeaker, or an actuator that is configured and positioned to be sensed by an observer.

The input components of the eyewear device 100 may include alphanumeric input components (e.g., a touch screen or touchpad configured to receive alphanumeric input, a photo-optical keyboard, or other alphanumeric-configured elements), pointer-based input components (e.g., a mouse, a touchpad, a trackball, a joystick, a motion sensor, or other pointing instruments), tactile input components (e.g., a button switch, a touch screen or touchpad that senses the location, force or location and force of touches or touch gestures, or other tactile-configured elements), visual input (e.g., hand gestures captured via cameras 114A-B), and audio input components (e.g., a microphone), and the like. The mobile device 401 and the server system 498 may include alphanumeric, pointer-based, tactile, audio, visual, and other input components.

In some examples, the eyewear device 100 includes a collection of motion-sensing components referred to as an inertial measurement unit 472. The motion-sensing components may be micro-electro-mechanical systems (MEMS) with microscopic moving parts, often small enough to be part of a microchip. The inertial measurement unit (IMU) 472 in some example configurations includes an accelerometer, a gyroscope, and a magnetometer. The accelerometer senses the linear acceleration of the device 100 (including the acceleration due to gravity) relative to three orthogonal axes (x, y, z). The gyroscope senses the angular velocity of the device 100 about three axes of rotation (pitch, roll, yaw). Together, the accelerometer and gyroscope can provide position, orientation, and motion data about the device relative to six axes (x, y, z, pitch, roll, yaw). The magnetometer, if present, senses the heading of the device 100 relative to magnetic north. The position of the device 100 may be determined by location sensors, such as a GPS unit, one or more transceivers to generate relative position coordinates, altitude sensors or barometers, and other orientation sensors. Such positioning system coordinates can also be received over the wireless connections 425, 437 from the mobile device 401 via the low-power wireless circuitry 424 or the high-speed wireless circuitry 436.

The IMU 472 may include or cooperate with a digital motion processor or programming that gathers the raw data from the components and compute a number of useful values about the position, orientation, and motion of the device 100. For example, the acceleration data gathered from the accelerometer can be integrated to obtain the velocity relative to each axis (x, y, z); and integrated again to obtain the position of the device 100 (in linear coordinates, x, y, and z). The angular velocity data from the gyroscope can be integrated to obtain the position of the device 100 (in spherical coordinates). The programming for computing these useful values may be stored in memory 434 and executed by the high-speed processor 432 of the eyewear device 100.

The eyewear device 100 may optionally include additional peripheral sensors, such as biometric sensors, specialty sensors, or display elements integrated with eyewear device 100. For example, peripheral device elements may include any I/O components including output components, motion components, position components, or any other such elements described herein. For example, the biometric sensors may include components to detect expressions (e.g., hand expressions, facial expressions, vocal expressions, body gestures, or eye tracking), to measure bio signals (e.g., blood pressure, heart rate, body temperature, perspiration, or brain waves), or to identify a person (e.g., identification based on voice, retina, facial characteristics, fingerprints, or electrical bio signals such as electroencephalogram data), and the like.

The mobile device 401 may be a smartphone, tablet, laptop computer, access point, or any other such device capable of connecting with eyewear device 100 using both a low-power wireless connection 425 and a high-speed wireless connection 437. Mobile device 401 is connected to server system 498 and network 495. The network 495 may include any combination of wired and wireless connections.

Figure 5:
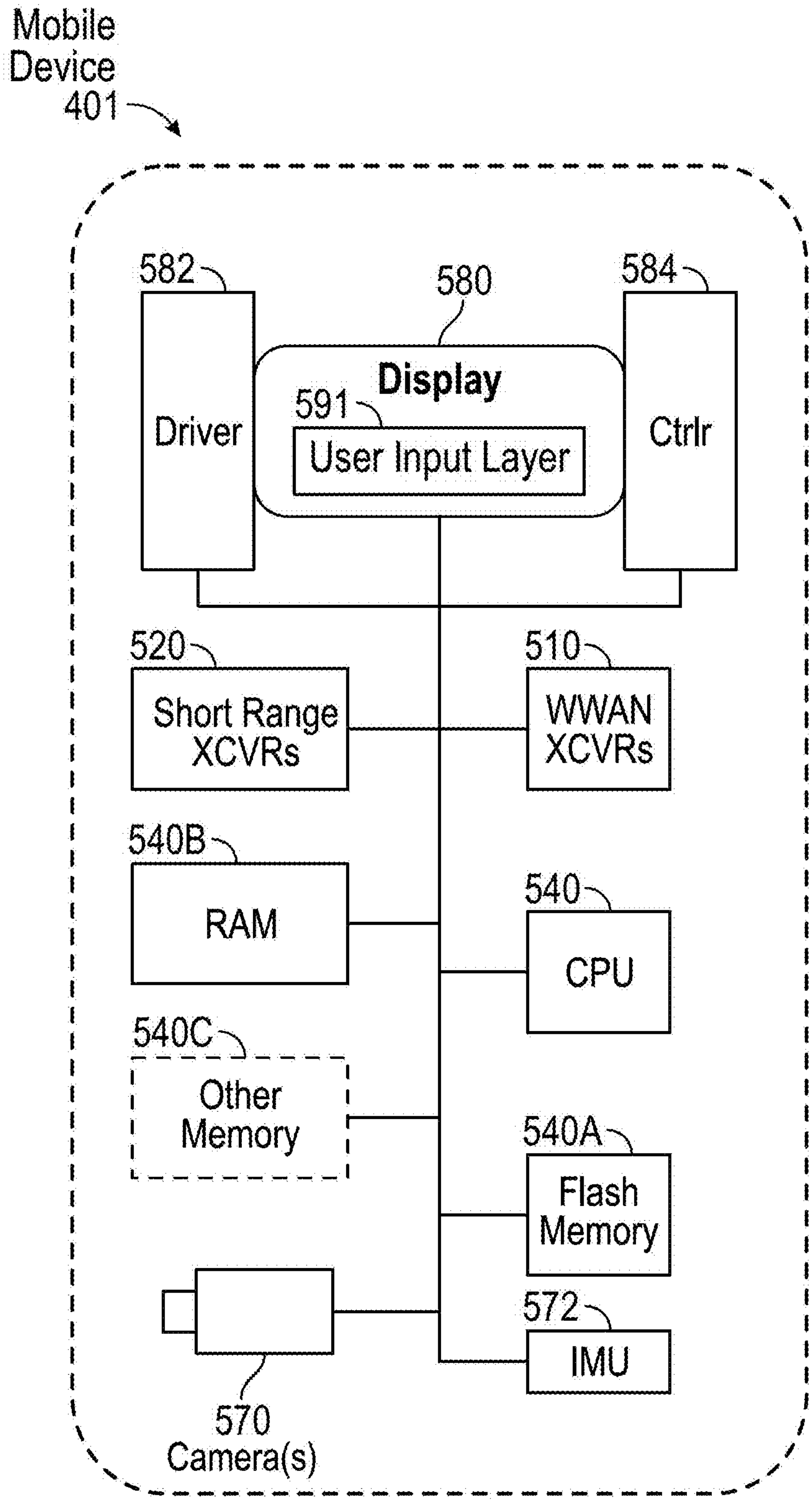
FIG. 5 is a diagrammatic representation of an example hardware configuration for a mobile device of the audio system including the HRTF modeling system of FIG. 4.

The HRTF modeling system 400, as shown in FIG. 4, includes a computing device, such as mobile device 401, coupled to an eyewear device 100 over a network. The HRTF modeling system 400 includes a memory for storing instructions and a processor for executing the instructions. Execution of the instructions of the HRTF modeling system 400 by the processor 432 configures the eyewear device 100 to act alone or cooperate with one or more other computing device, e.g., the mobile device 401 or the server system 498. The HRTF modeling system 400 may utilize the memory 434 of the eyewear device 100 or the memory elements 540A, 540B, 540C of the mobile device 401 (FIG. 5). Also, the HRTF modeling system 400 may utilize the processor elements 432, 422 of the eyewear device 100 or the central processing unit (CPU) 530 of the mobile device 401 (FIG. 5). In addition, the HRTF modeling system 400 may further utilize the memory and processor elements of the server system 498. In this aspect, the memory and processing functions of the HRTF modeling system 400 can be shared or distributed across the eyewear device 100, the mobile device 401, and the server system 498.

The memory 434, in some example implementations, may include a hand gesture library 480. The library of hand gestures 480 includes poses and gestures, with the hand in various positions and orientations. The stored poses and gestures are suitable for comparison to a hand shape that is detected in an image. The library 480 includes three-dimensional coordinates for landmarks of the hand, e.g., from the wrist to the fingertips, for use in matching. For example, a hand gesture record stored in the library 480 may include a hand gesture identifier (e.g., pointing finger, closed fist, open palm, relaxed hand, grasping an object, pinching, spreading), a point of view or a directional reference (e.g., palmar side visible, dorsal, lateral), and other information about orientation, along with three-dimensional coordinates for the wrist, the fifteen interphalangeal joints, the five fingertips and other skeletal or soft-tissue landmarks. The process of detecting a hand shape, in some implementations, involves comparing the pixel-level data in one or more captured frames of video data to the hand gestures stored in the library 480 until a match is found, e.g., by applying a machine vision algorithm. A match may be determined when a predefined confidence threshold set in the machine vision algorithm is exceeded.

The memory 434 additionally includes, in some example implementations, audio filters 481, a virtual object database 482, a virtual object processing system 484, an audio zone detection system 486, and an audio procession system 488.

The audio filters 481 may include multiple predefined HRTF audio filters (e.g., a left audio filter and a right audio filter for each zone) for processing a virtual object audio track based on its position. In one example, the HRTF equalization and delay needed for any zone is pre-calculated as a small set of biquad filters (e.g., 4-7 biquad filters per zone; where each filter represents 6 multiply-and-accumulate operations). A digital biquadratic (biquad) filter is a second order recursive linear filter, containing two poles and two zeros. In the Z domain, a biquad filter's transfer function is the ratio of two quadratic functions ($H(z)=(b_0+b_1z^{-1}+b_2z^{-2})/(a_0+a_1z^{-1}+a_2z^{-2})$).

The virtual object database 482 includes information associated with virtual objects. In one example, the virtual object database 482 includes audio information (e.g., an audio track) and visual information (e.g., images for creating appearance) associated with a virtual object.

The virtual object processing system 484 generates instructions for presenting virtual objects on the image display of optical assembly 180A-B and controlling movement of the virtual objects. The virtual object processing system 484 additionally calculates information associated with the virtual object such as its position, directional velocity, and distance with respect to the user. The audio zone detection system 486, generates instructions for detecting which zone the virtual object is currently in with respect to the head of a user. In one example the audio zone detection system 484 maintains a map (see FIG. 8A) representing the zones surrounding a head of a user for use in zone detection. The audio processing system 488 generates instructions for applying HRTF filters to the audio tracks of the virtual objects responsive to their current position and presenting sound to the user via audio processor 413 and speakers 185A-B.

The memory 434 may additionally include an image capture application, a localization system, and an image processing system. In an HRTF modeling system 400 in which a camera is capturing frames of video data, the image capture application configures the processor 432 to detect a hand shape (e.g., a pointing index finger). The localization system configures the processor 432 to obtain localization data for use in determining the position of the eyewear device 100 relative to the physical environment. The localization data may be derived from a series of images, an IMU 472, a GPS unit, or a combination thereof. The image processing system configures the processor 432 to present a captured still image on a display of an optical assembly 180A-B in cooperation with the image display driver 442 and the image processor 412.

FIG. 5 is a high-level functional block diagram of an example mobile device 401. Mobile device 401 includes a flash memory 540A which stores programming to be executed by the CPU 540 to perform all or a subset of the functions described herein. As shown in FIG. 5, the CPU 540 of the mobile device 401 may be coupled to a camera 570, a mobile display driver 582, a user input layer 591, and flash memory 540A.

The mobile device 401 may include a camera 570 that comprises at least two visible-light cameras (first and second visible-light cameras with overlapping fields of view) or at least one visible-light camera and a depth sensor with substantially overlapping fields of view. Flash memory 540A may further include multiple images or video, which are generated via the camera 570.

As shown, the mobile device 401 includes an image display 580, a mobile display driver 582 to control the image display 580, and a display controller 584. In the example of FIG. 5, the image display 580 includes a user input layer 591 (e.g., a touchscreen) that is layered on top of or otherwise integrated into the screen used by the image display 580. Examples of touchscreen-type mobile devices that may be used include (but are not limited to) a smart phone, a personal digital assistant (PDA), a tablet computer, a laptop computer, or other portable device. However, the structure and operation of the touchscreen-type devices is provided by way of example; the subject technology as described herein is not intended to be limited thereto. For purposes of this discussion, FIG. 5 therefore provides a block diagram illustration of the example mobile device 401 with a user interface that includes a touchscreen input layer 591 for receiving input (by touch, multi-touch, or gesture, and the like, by hand, stylus, or other tool) and an image display 580 for displaying content As shown in FIG. 5, the mobile device 401 includes at least one digital transceiver (XCVR) 510, shown as WWAN XCVRs, for digital wireless communications via a wide-area wireless mobile communication network. The mobile device 401 also includes additional digital or analog transceivers, such as short-range transceivers (XCVRs) 520 for short-range network communication, such as via NFC, VLC, DECT, ZigBee, BLUETOOTH®, or WI-FI®. For example, short range XCVRs 520 may take the form of any available two-way wireless local area network (WLAN) transceiver of a type that is compatible with one or more standard protocols of communication implemented in wireless local area networks, such as one of the WI-FI® standards under IEEE 802.11.

To generate location coordinates for positioning of the mobile device 401, the mobile device 401 can include a global positioning system (GPS) receiver. Alternatively, or additionally the mobile device 401 can utilize either or both the short range XCVRs 520 and WWAN XCVRs 510 for generating location coordinates for positioning. For example, cellular network, WI-FI®, or BLUETOOTH® based positioning systems can generate very accurate location coordinates, particularly when used in combination. Such location coordinates can be transmitted to the eyewear device over one or more network connections via XCVRs 510, 520.

The transceivers 510, 520 (i.e., the network communication interface) conforms to one or more of the various digital wireless communication standards utilized by modern mobile networks. Examples of WWAN transceivers 510 include (but are not limited to) transceivers configured to operate in accordance with Code Division Multiple Access (CDMA) and 3rd Generation Partnership Project (3GPP) network technologies including, for example and without limitation, 3GPP type 2 (or 3GPP2) and LTE, at times referred to as "4G." For example, the transceivers 510, 520 provide two-way wireless communication of information including digitized audio signals, still image and video signals, web page information for display as well as web-related inputs, and various types of mobile message communications to/from the mobile device 401.

The mobile device 401 further includes a microprocessor that functions as a central processing unit (CPU) shown as CPU 540 in FIG. 5. A processor is a circuit having elements structured and arranged to perform one or more processing functions, typically various data processing functions. Although discrete logic components could be used, the examples utilize components forming a programmable CPU. A microprocessor for example includes one or more integrated circuit (IC) chips incorporating the electronic elements to perform the functions of the CPU. The CPU 540, for example, may be based on any known or available microprocessor architecture, such as a Reduced Instruction Set Computing (RISC) using an ARM architecture, as commonly used today in mobile devices and other portable electronic devices. Of course, other arrangements of processor circuitry may be used to form the CPU 540 or processor hardware in smartphone, laptop computer, and tablet.

The CPU 540 serves as a programmable host controller for the mobile device 401 by configuring the mobile device 401 to perform various operations, for example, in accordance with instructions or programming executable by CPU 540. For example, such operations may include various general operations of the mobile device 401, as well as operations related to the programming for applications on the mobile device 401. Although a processor may be configured by use of hardwired logic, typical processors in mobile devices are general processing circuits configured by execution of programming.

The mobile device 401 includes a memory or storage system, for storing programming and data. In the example, the memory system may include a flash memory 540A, a random-access memory (RAM) 540B, and other memory components 540C, as needed. The RAM 540B serves as short-term storage for instructions and data being handled by the CPU 540, e.g., as a working data processing memory. The flash memory 540A typically provides longer-term storage.

Hence, in the example of mobile device 401, the flash memory 540A is used to store programming or instructions for execution by the CPU 540. Depending on the type of device, the mobile device 401 stores and runs a mobile operating system through which specific applications are executed. Examples of mobile operating systems include Google Android, Apple iOS (for iPhone or iPad devices), Windows Mobile, Amazon Fire OS, RIM BlackBerry OS, or the like.

The processor 432 within the eyewear device 100 may construct a map of the environment surrounding the eyewear device 100, determine a location of the eyewear device 100 within the mapped environment, and determine a relative position of the eyewear device 100 to one or more objects in the mapped environment. The processor 432 may construct the map and determine location and position information using a simultaneous localization and mapping (SLAM) algorithm applied to data received from one or more sensors. Sensor data includes images received from one or both of the cameras 114A, 114B, distance(s) received from a laser range finder, position information received from a GPS unit, motion and acceleration data received from an IMU 572, or a combination of data from such sensors, or from other sensors that provide data useful in determining positional information. In the context of augmented reality, a SLAM algorithm is used to construct and update a map of an environment, while simultaneously tracking and updating the location of a device (or a user) within the mapped environment. The mathematical solution can be approximated using various statistical methods, such as particle filters, Kalman filters, extended Kalman filters, and covariance intersection. In a system that includes a high-definition (HD) video camera that captures video at a high frame rate (e.g., thirty frames per second), the SLAM algorithm updates the map and the location of objects at least as frequently as the frame rate, in other words, calculating and updating the mapping and localization thirty times per second.

Sensor data includes image(s) received from one or both cameras 114A, 114B, distance(s) received from a laser range finder, position information received from a GPS unit, motion and acceleration data received from an IMU 472, or a combination of data from such sensors, or from other sensors that provide data useful in determining positional information.

Figure 6:
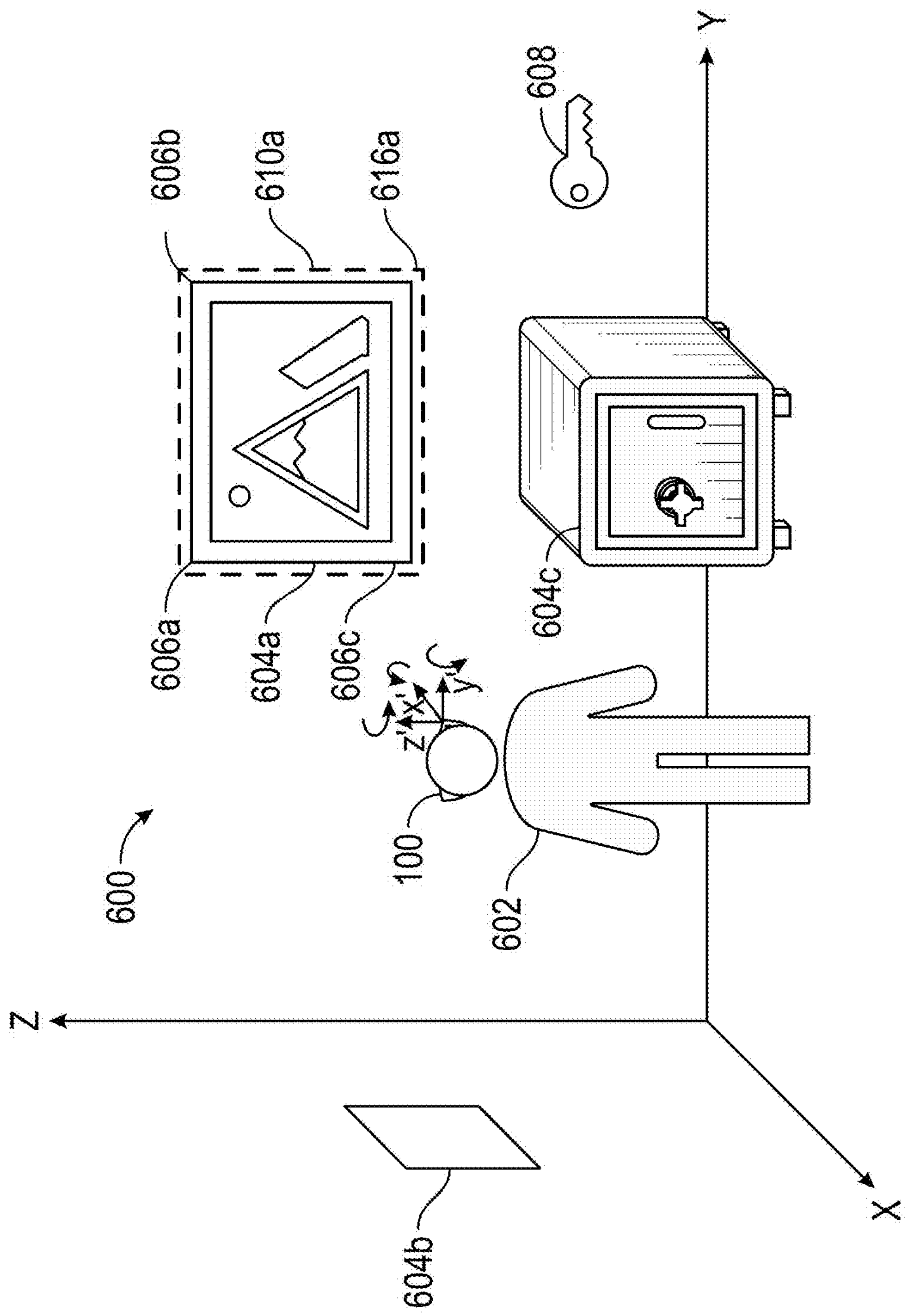
FIG. 6 is a schematic illustration of a user in an example environment for use in describing simultaneous localization and mapping.

FIG. 6 depicts an example physical environment 600 along with elements that are useful for natural feature tracking (NFT; e.g., a tracking application using a SLAM algorithm). A user 602 of eyewear device 100 is present in an example physical environment 600 (which, in FIG. 6, is an interior room). The processor 432 of the eyewear device 100 determines its position with respect to one or more objects 604 within the environment 600 using captured images, constructs a map of the environment 600 using a coordinate system (x, y, z) for the environment 600, and determines its position within the coordinate system. Additionally, the processor 432 determines a head pose (roll, pitch, and yaw) of the eyewear device 100 within the environment by using two or more location points (e.g., three location points 606*a*, 606*b*, and 606*c*) associated with a single object 604*a*, or by using one or more location points 606 associated with two or more objects 604*a*, 604*b*, 604*c*. The processor 432 of the eyewear device 100 may position a virtual object 608 (such as the key shown in FIG. 6) within the environment 600 for viewing during an augmented reality experience.

Markers 610 are registered at locations in the environment to assist devices with the task of tracking and updating the location of users, devices, and objects (virtual and physical) in a mapped environment. Markers 610 are sometimes registered to a high-contrast physical object, such as the relatively dark object, such as the framed picture 604*a*, mounted on a lighter-colored wall, to assist cameras and other sensors with the task of detecting the marker. The markers 610 may be preassigned or may be assigned by the eyewear device 100 upon entering the environment.

Markers 610 can be encoded with or otherwise linked to information. A marker 610 may include position information, a physical code (such as a bar code or a QR code), or a combination thereof and may be either visible to the user or hidden. A set of data associated with each marker 610 is stored in the memory 434 of the eyewear device 100. The set of data includes information about the marker 610*a*, the marker's position (location and orientation), one or more virtual objects, or a combination thereof. The marker position may include three-dimensional coordinates for one or more marker landmarks 616*a*, such as the corner of the generally rectangular marker 610*a* shown in FIG. 6. The marker location may be expressed relative to real-world geographic coordinates, a system of marker coordinates, a position of the eyewear device 100, or other coordinate system. The one or more virtual objects associated with the marker 610*a* may include any of a variety of material, including still images, video, audio, tactile feedback, executable applications, interactive user interfaces and experiences, and combinations or sequences of such material. Any type of content capable of being stored in a memory, retrieved when the marker 610*a* is encountered, or associated with an assigned marker may be classified as a virtual object in this context. The key 608 shown in FIG. 6, for example, is a virtual object displayed as a still image, either 2D or 3D, at a marker location.

In one example, the marker 610*a* may be registered in memory as being located near and associated with a physical object 604*a* (e.g., the framed work of art shown in FIG. 6). In another example, the marker may be registered in memory as being a particular position with respect to the eyewear device 100.

Figure 7:
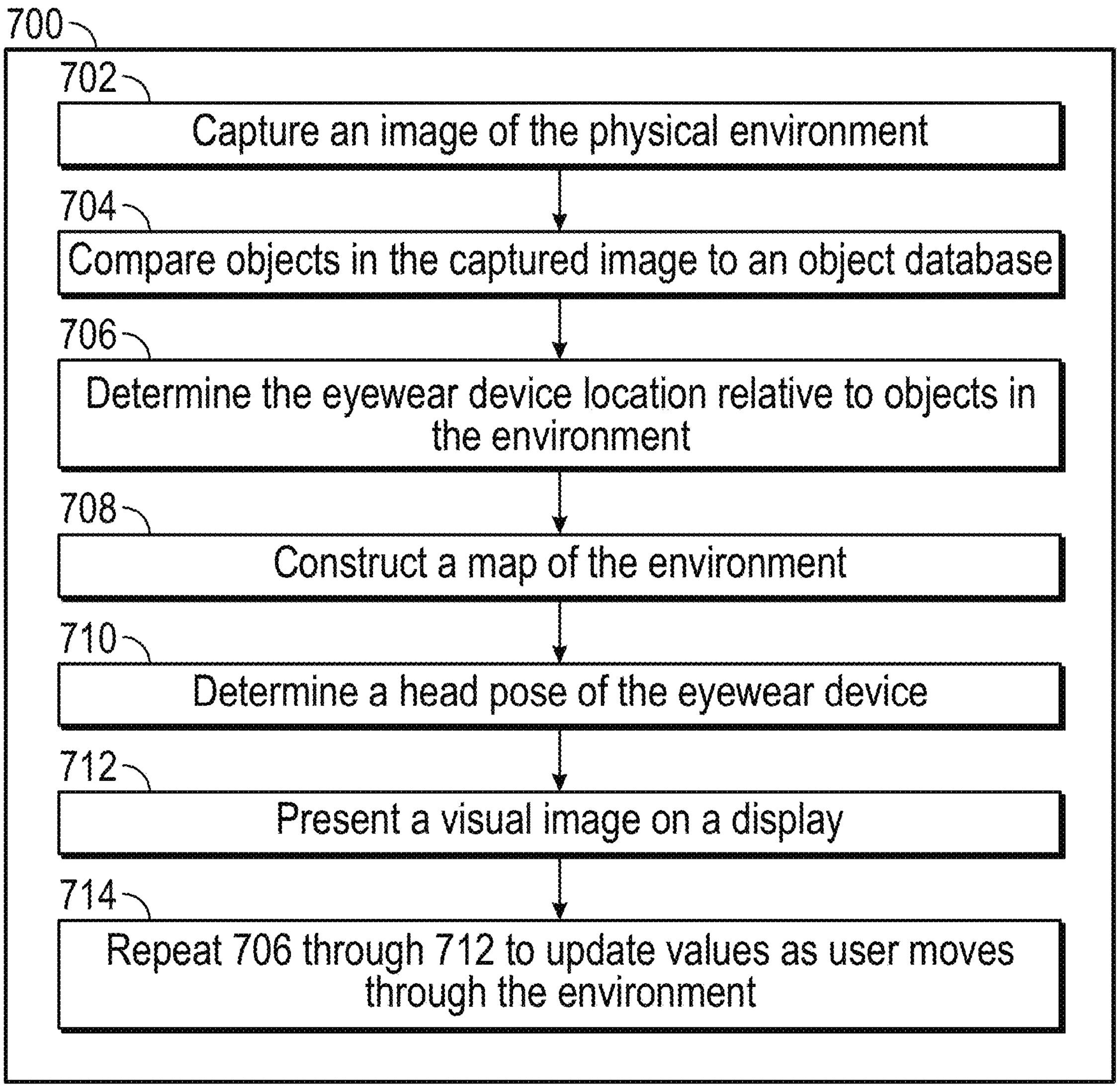
FIG. 7 is a flow chart listing steps in an example method of displaying virtual objects in a physical environment.

FIG. 7 is a flow chart 700 depicting a method for implementing augmented reality applications described herein on a wearable device (e.g., an eyewear device). Although the steps are described with reference to the eyewear device 100, as described herein, other implementations of the steps described, for other types of devices, will be understood by one of skill in the art from the description herein. Additionally, it is contemplated that one or more of the steps shown in FIG. 7, and in other figures, and described herein may be omitted, performed simultaneously or in a series, performed in an order other than illustrated and described, or performed in conjunction with additional steps.

At block 702, the eyewear device 100 captures one or more input images of a physical environment 600 near the eyewear device 100. The processor 432 may continuously receive input images from the visible light camera(s) 114 and store those images in memory 434 for processing. Additionally, the eyewear device 100 may capture information from other sensors (e.g., location information from a GPS unit, orientation information from an IMU 472, or distance information from a laser distance sensor).

At block 704, the eyewear device 100 compares objects in the captured images to objects stored in a library of images to identify a match. In some implementations, the processor 432 stores the captured images in memory 434. A library of images of known objects is stored in a virtual object database 482.

In one example, the processor 432 is programmed to identify a predefined particular object (e.g., a particular picture 604*a* hanging in a known location on a wall, a window 604*b* in another wall, or an object such as a safe 604*c* positioned on the floor). Other sensor data, such as GPS data, may be used to narrow down the number of known objects for use in the comparison (e.g., only images associated with a room identified through GPS coordinates). In another example, the processor 432 is programmed to identify predefined general objects (such as one or more trees within a park).

At block 706, the eyewear device 100 determines its position with respect to the object(s). The processor 432 may determine its position with respect to the objects by comparing and processing distances between two or more points in the captured images (e.g., between two or more location points on one objects 604 or between a location point 606 on each of two objects 604) to known distances between corresponding points in the identified objects. Distances between the points of the captured images greater than the points of the identified objects indicates the eyewear device 100 is closer to the identified object than the imager that captured the image including the identified object. On the other hand, distances between the points of the captured images less than the points of the identified objects indicates the eyewear device 100 is further from the identified object than the imager that captured the image including the identified object. By processing the relative distances, the processor 432 is able to determine the position within respect to the objects(s). Alternatively, or additionally, other sensor information, such as laser distance sensor information, may be used to determine position with respect to the object(s).

At block 708, the eyewear device 100 constructs a map of an environment 600 surrounding the eyewear device 100 and determines its location within the environment. In one example, where the identified object (block 704) has a predefined coordinate system (x, y, z), the processor 432 of the eyewear device 100 constructs the map using that predefined coordinate system and determines its position within that coordinate system based on the determined positions (block 706) with respect to the identified objects. In another example, the eyewear device constructs a map using images of permanent or semi-permanent objects 604 within an environment (e.g., a tree or a park bench within a park). In accordance with this example, the eyewear device 100 may define the coordinate system ($x^1$, $y^1$, $z^1$) used for the environment.

At block 710, the eyewear device 100 determines a head pose (roll, pitch, and yaw) of the eyewear device 100 within the environment. The processor 432 determines head pose by using two or more location points (e.g., three location points 606*a*, 606*b*, and 606*c*) on one or more objects 604 or by using one or more location points 606 on two or more objects 604. Using conventional image processing algorithms, the processor 432 determines roll, pitch, and yaw by comparing the angle and length of a lines extending between the location points for the captured images and the known images.

Figure 10:
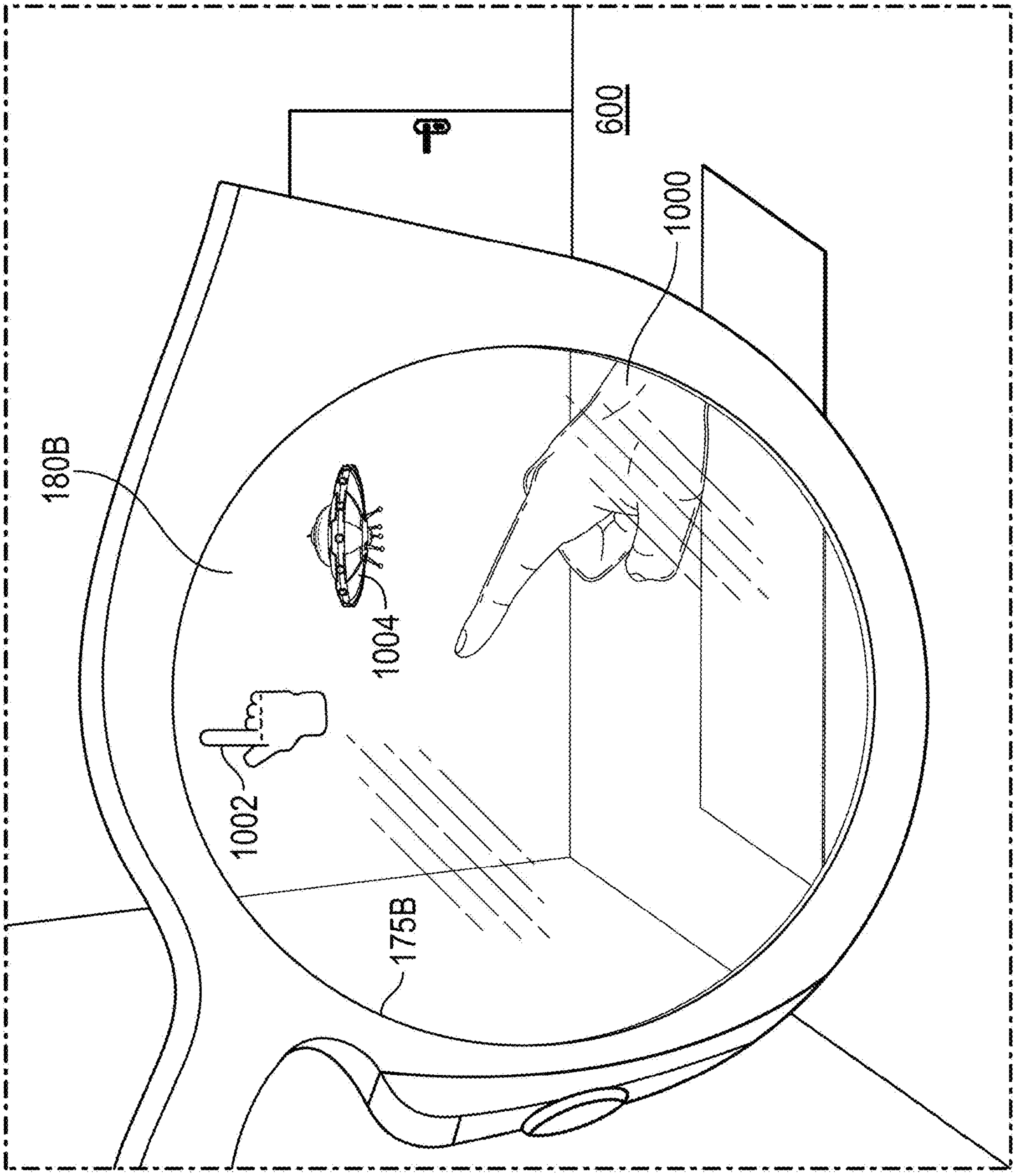
FIG. 10 is a perspective illustration of a virtual objects presented on a display of an eyewear device.

At block 712, the eyewear device 100 presents visual images to the user. The processor 432 presents images to the user on the image displays 180 using the image processor 412 and the image display driver 442. The image processor 412 develops and presents the visual images via the image displays responsive to the location of the eyewear device 100 within the environment 600. In one example, the visual images include an image of a hand 1002 (FIG. 10) for manipulating features of a GUI (FIG. 8B) and a virtual space craft 1004 (FIG. 10).

At block 714, the steps described above with reference to blocks 706-712 are repeated to update the position of the eyewear device 100 and what is viewed by the user 602 as the user moves through the environment 600.

Processing Audio of Virtual Objects

Figure 8A:
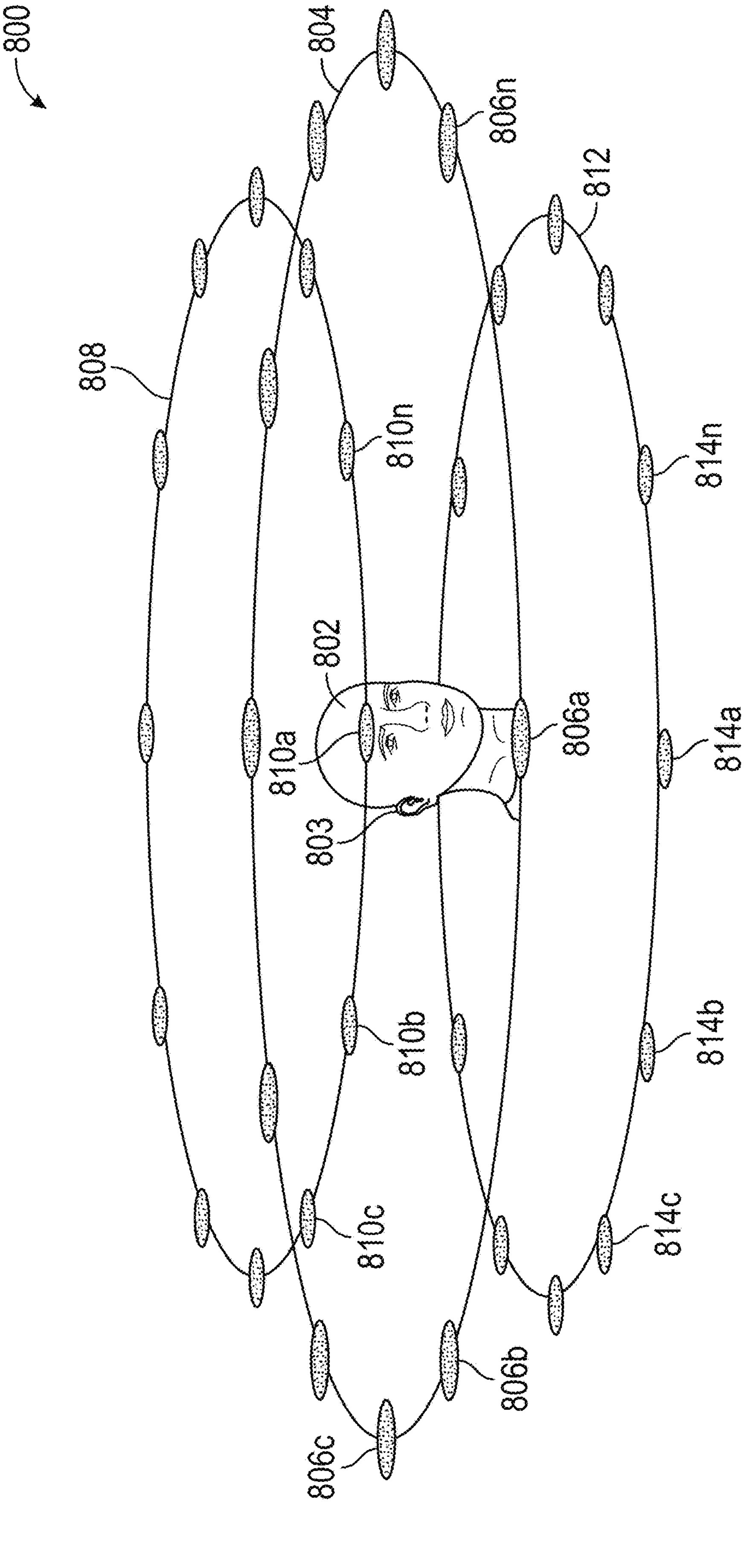
FIG. 8A is an illustration of virtual objects in audio zones surrounding a head of a user in a head-related transfer function (HRTF) model.

FIG. 8A is an illustration representing a zone map 800 with objects (36 objects in FIG. 8A) positioned in each of multiple zones surrounding the objects (e.g., 36 zones; not illustrated) around a user for use in selecting HRTF filters to apply to audio tracks for presentation at an ear 803 of the user. The zone map defines the boundary of each zone. In an example, the space around the head 802 of the user is defined into 36 zones: 12 sectors rotationally around the head (like a clock), with each sector broken into 3 vertical zones: above ear 808, at ear level 804, and below ear 812. Objects 806*a-n* are positioned within respective zones around the user at ear level 804, objects 810*a-n* are positioned within respective zones around the user above ear level 808, objects 814*a-n* are positioned within respective zones around the user below ear level 812.

Figure 8B:
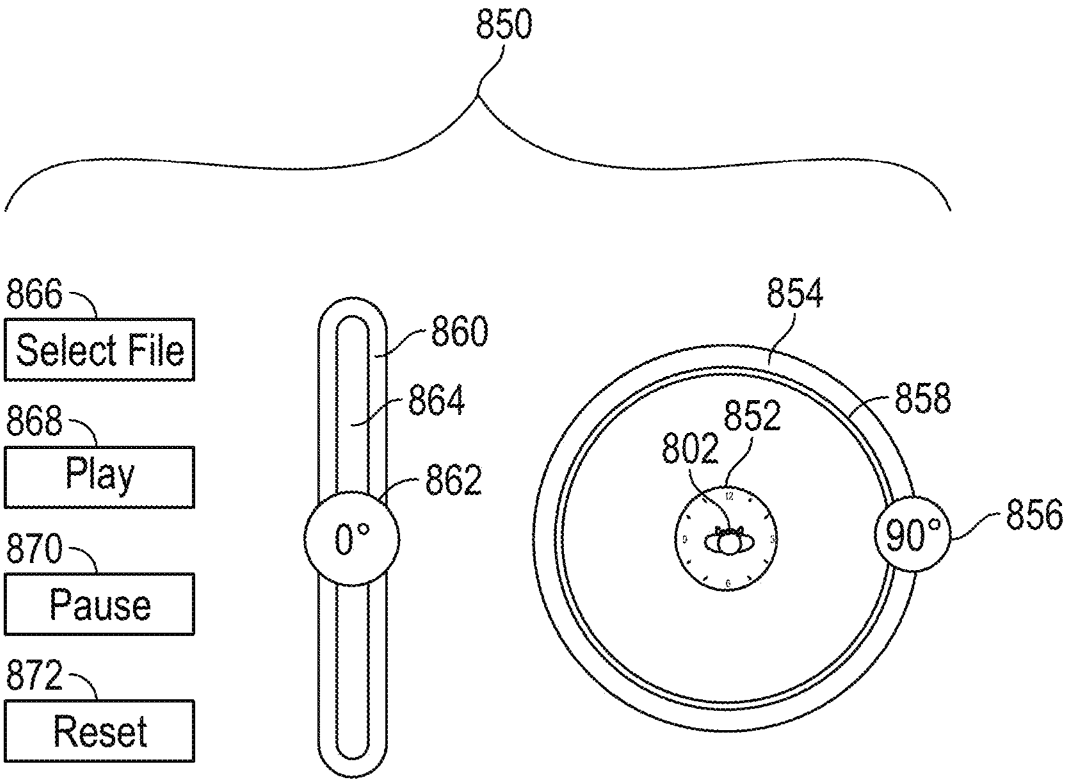
FIG. 8B is a graphical user interface for use in testing predefined filters of the head-related transfer function model of FIG. 8A.

FIG. 8B is a graphical user interface (GUI) 850 for testing the filters applied to an audio track of a virtual object responsive to the position of the object with respect to the head 802 of the user. A clock 852 is present around the head 802 of the user to represent the 12 sectors/zones surrounding the head 802. A circular control 854 and a linear control 860 are present to select the filters to apply to an audio track to make a sound appear as if it is coming from different locations around the head 802 the user. The circular control 854 selects the direction of the sound in a plane surrounding the head 802 and the linear control 860 selects the whether the sound is at ear level, above ear level, or below ear level. Manipulating the controls selects filters to make sound appear as if it is coming from the desired direction.

The circular control 854 is present around the clock 852. The circular control includes a circular track 858 and a selector 856 positioned within the track 858 for selecting a direction. The illustrated selector 856 includes an indicator representing angular information associated with the desired direction from which the sound should be perceived as coming from (90 degrees in the illustrated example representing that the sound should appear as if it is coming from the right side of the user). A user moves the selector 856 around the circular track 858 to change the direction selection.

The linear control 860 includes a linear track 864. A selector 862 is positioned within the track 864 for selecting the level (e.g., ear level, below ear level, above ear level). A user moves the selector 862 along the track 864 to change the level.

The GUI 850 additionally includes an audio selection button 866 for selecting an audio track, a play button 868 for playing the selection audio track, a pause button 870 for pausing the audio track, and a reset button 872 for resetting the indicators 856/862 to their default locations (e.g., selection 856 at 90 degrees and selector 862 at 0 degrees).

The GUI may be presented on the display 180A, 180B of the eyewear device 100, the display 580 of the mobile device 401 or the display for a remote computer such as a server system 498. In one example, a user may manipulate the selectors 856/862 and actuate the buttons 866/868/870/872 using a user input device 491 of the eyewear device 100, using user input layer 591 of the mobile device, or a user input of another device.

In another example, a user may manipulate the selectors 856/862 and actuate the buttons 866/868/870/872 through hand gestures captured by the cameras 114A, 114B of the eyewear device 100. In accordance with this example, the processor 432 of an eyewear device 100 is configured to capture frames of video data with a camera 114A, 114B. Objects in the images are compared to the hand gesture library 480 to identify predefined hand gestures (e.g., a pointing index finger) associated with an action. When a hand gesture is identified, its position is determined with respect to the selectors 856/862 and actuate the buttons 866/868/870/872. A modification of the hand gesture (e.g., a tapping motion when the tip of the index finger is near a button or a swiping motion when the tip of the index finger is near a selector) results in an actuation of the buttons/selector.

The process of determining whether a detected hand shape matches a predefined gesture, in some implementations, involves comparing the pixel-level data about the hand shape in one or more captured frames of video data to the collection of hand gestures stored in the hand gesture library 480. The detected hand shape data may include three-dimensional coordinates for the wrist, up to fifteen interphalangeal joints, up five fingertips, and other skeletal or soft-tissue landmarks found in a captured frame. These data are compared to hand gesture data stored in the hand gesture library 480 until the best match is found. In some examples, the process includes calculating the sum of the geodesic distances between the detected hand shape fingertip coordinates and a set of fingertip coordinates for each hand gesture stored in the library 480. A sum that is within a configurable threshold accuracy value represents a match.

In another example implementation, the process of determining whether a detected hand shape matches a predefined gesture, involves using a machine-learning algorithm to compare the pixel-level data about the hand shape in one or more captured frames of video data to a collection of images that include hand gestures. Machine learning refers to an algorithm that improves incrementally through experience. By processing a large number of different input datasets, a machine-learning algorithm can develop improved generalizations about particular datasets, and then use those generalizations to produce an accurate output or solution when processing a new dataset. Broadly speaking, a machine-learning algorithm includes one or more parameters that will adjust or change in response to new experiences, thereby improving the algorithm incrementally; a process similar to learning.

In the context of computer vision, mathematical models attempt to emulate the tasks accomplished by the human visual system, with the goal of using computers to extract information from an image and achieve an accurate understanding of the contents of the image. Computer vision algorithms have been developed for a variety of fields, including artificial intelligence and autonomous navigation, to extract and analyze data in digital images and video.

Deep learning refers to a class of machine-learning methods that are based on or modeled after artificial neural networks. An artificial neural network is a computing system made up of a number of simple, highly interconnected processing elements (nodes), which process information by their dynamic state response to external inputs. A large artificial neural network might have hundreds or thousands of nodes.

A convolutional neural network (CNN) is a type of neural network that is frequently applied to analyzing visual images, including digital photographs and video. The connectivity pattern between nodes in a CNN is typically modeled after the organization of the human visual cortex, which includes individual neurons arranged to respond to overlapping regions in a visual field. A neural network that is suitable for use in the determining process described herein is based on one of the following architectures: VGG16, VGG19, ResNet50, Inception V3, Xception, or other CNN-compatible architectures.

In the machine-learning example, the processor 432 determines whether a detected hand shape substantially matches a predefined gesture using a machine-trained algorithm referred to as a hand feature model. The processor 432 is configured to access the hand feature model, trained through machine learning, and applies the hand feature model to identify and locate features of the hand shape in one or more frames of the video data.

In one example implementation, the trained hand feature model receives a frame of video data which contains a detected hand shape and abstracts the image in the frame into layers for analysis. Data in each layer is compared to hand gesture data stored in the hand gesture library 480, layer by layer, based on the trained hand feature model, until a good match is identified.

In one example, the layer-by-layer image analysis is executed using a convolutional neural network. In a first convolution layer, the CNN identifies learned features (e.g., hand landmarks, sets of joint coordinates, and the like). In a second convolution layer, the image is transformed into a plurality of images, in which the learned features are each accentuated in a respective sub-image. In a pooling layer, the sizes and resolution of the images and sub-images are reduced in order isolation portions of each image that include a possible feature of interest (e.g., a possible palm shape, a possible finger joint). The values and comparisons of images from the non-output layers are used to classify the image in the frame. Classification, as used herein, refers to the process of using a trained model to classify an image according to the detected hand shape. For example, an image may be classified as "pointer gesture present" if the detected hand shape matches the pointer gesture from the library 480.

In some example implementations, the processor 432, in response to detecting a pointing gesture, presents on the display 180A, 180B an indicator 1002 (see FIG. 10). The indicator 1002 informs the wearer that a predefined gesture has been detected. The indicator 1002 in one example is an object, such as the pointing finger 1000 shown in FIG. 10. The indicator 1002 may include one or more visible, audible, tactile, and other elements to inform or alert the wearer that a pointer gesture has been detected. A user may move the indicator 1002 by moving the detected hand gesture within the field of view of the eyewear device 100.

Figure 9A:
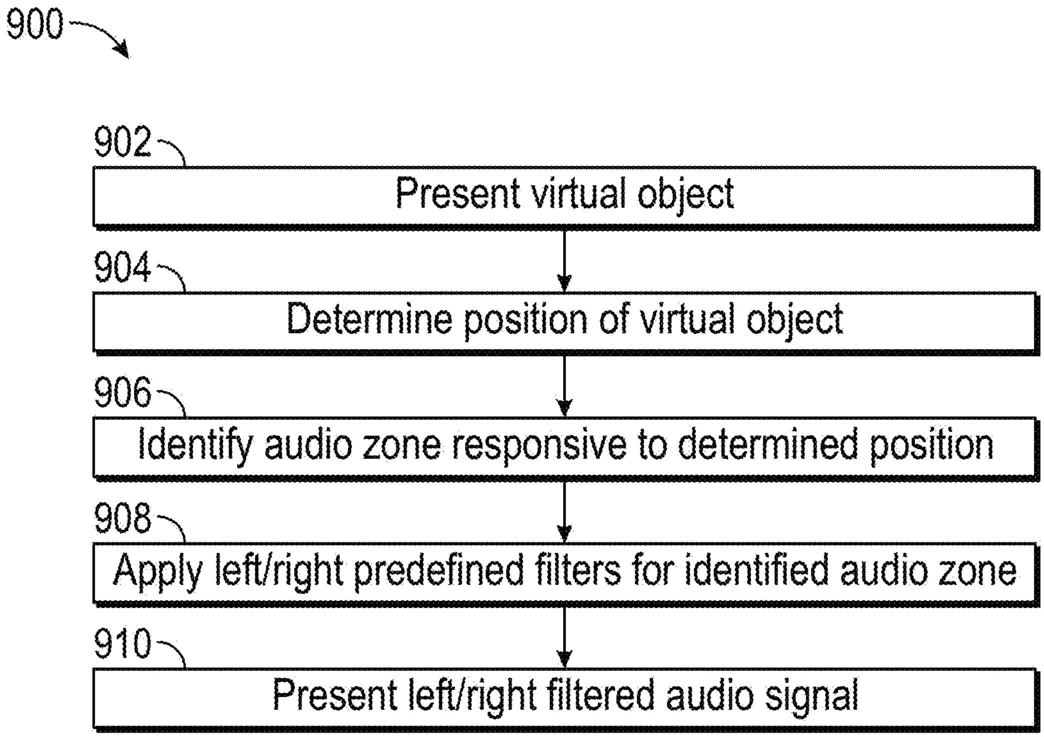
FIG. 9A is a flow chart listing the steps in an example method of processing an audio track of a virtual object using a head in accordance with the HRTF of FIG. 8A.

FIG. 9A is a flow chart 900 listing the steps in an example method for presenting audio signals using a HRTF. Although the steps are described with reference to the eyewear device 100, as described herein, other implementations of the steps described, for other types of mobile devices, will be understood by one of skill in the art from the description herein. Additionally, it is contemplated that one or more of the steps shown and described may be omitted, performed simultaneously or in a series, performed in an order other than illustrated and described, or performed in conjunction with additional steps.

At block 902, the system presents a virtual object (e.g., spacecraft 1004 in FIG. 10). In an example, the processor 432 retrieves a virtual object from the virtual object database 482. The retrieved virtual object has an associated audio track. The processor 432 processes the virtual object using the virtual object processing system 484, which controls the image processor 412 to present the virtual object as images on displays of the optical assembly 180A, 180B. The presented virtual object has a virtual position in three-dimensional space, which the virtual object process system 484 tracks.

At block 904, the system determines a current position (direction and optionally distance) of a virtual object with respect to the head of the user where the virtual object has an associated audio track. The current position includes a direction with respect to the head of the user. The current position may additionally include a distance with respect to the head of the user. In one example, the direction and distance are represented by a vector the virtual object processing system 484 calculates that intersects a position associated with the head of the user and the virtual position of the virtual object tracked by the virtual object processing system 484.

At block 906, the system identifies an audio zone responsive to the determined position. The processor 432 determines the audio zone using the audio zone detection system 486. In one example, the audio zone detection system 486 retrieves a 3D audio zone map, which includes a spherical shape surrounding an origin representing a location adjacent, on, or within the head of the wearer where the spherical shape is divided into multiple audio zones (e.g., 36 audio zones). The audio zone detection system 486 then projects the vector calculated at block 904 from the origin and calculates the intersection between the vector and the audio zone map. To identify the current audio zone, the audio zone detection system 486 finally identifies the intersected zone as the current audio zone of the virtual object.

At block 908, the system applies the left and the right predefined filters corresponding to the current audio zone to the audio track associated with the virtual object to produce the left audio signal and the right audio signal. The processor 432 applies the corresponding predefined filters to the audio track of the virtual object. In one example, the audio processing system 488 retrieves the audio filter corresponding to the zone from the audio filters 481 stored in the memory 434. The audio processing system 488 then applies the retrieved filters to the audio track produce a left audio signal and a right audio signal.

At block 910, the system presents the left audio signal with the first speaker and the right audio signal with the second speaker. The processor 432 presents the left audio signal with the first speaker 185A (e.g., to the left ear of the user) and the right audio signal with the second speaker 185B (e.g., to the right ear of the user). In an example, the audio processing system 488 instructs the audio processor 413 to present the left audio signal to the first speaker 185A and the right audio signal to the second speaker 185B.

Figure 9B:
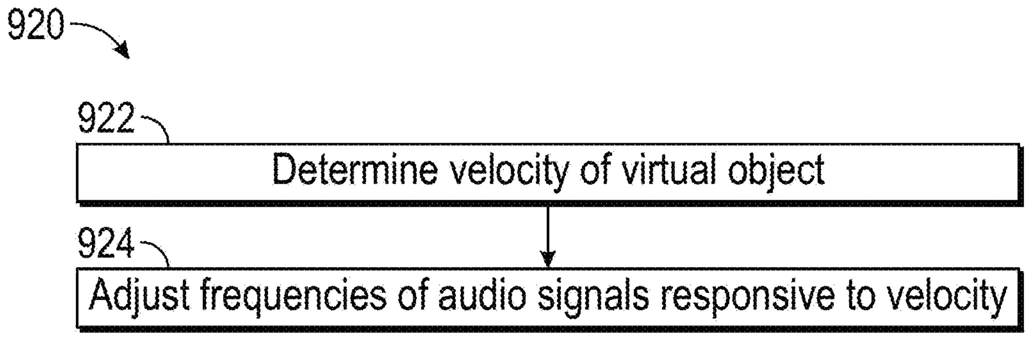
FIG. 9B is a flow chart listing steps in an example method of processing an audio track to add directional velocity information.

FIG. 9B is a flow chart 920 listing steps in an example method for adjusting the audio track of the virtual object to produce audio signals corresponding to the directional velocity of the virtual object with respect to the head of the user. The adjustments provide a more realistic audio experience that matches the visual interpretation by the user.

At block 922, the system determines a directional velocity of the virtual object with respect to the head of the user. The system determines the directional velocity by monitoring movement of the current position of the virtual object over time. In one example, the virtual object processing system 484 periodically (e.g., every 10 ms) calculates the current position of the virtual object (e.g., as described above with reference to block 904). The virtual object processing system 484 then calculates a directional component between a prior (e.g., an immediately prior) position of the virtual object and a current position where the directional component is along a line extending between the origin associated with the head of the user and a position adjacent the virtual object to obtain a relative velocity of the object with respect to the user.

At block 924, the system adjusts frequencies of the left audio signal and the right audio signal responsive to the determined directional velocity. The processor 432 adjusts the frequency of the left audio signal and the right audio signal. In an example, the audio processing system 488 instructs the audio processor 413 to adjust the frequency (e.g., increasing the frequency when the directional velocity is toward the user and decreasing the frequency when the directional velocity is away from the user). The audio processing system 488 may adjust the frequencies by applying a conventional Doppler shift algorithm.

Figure 9C:
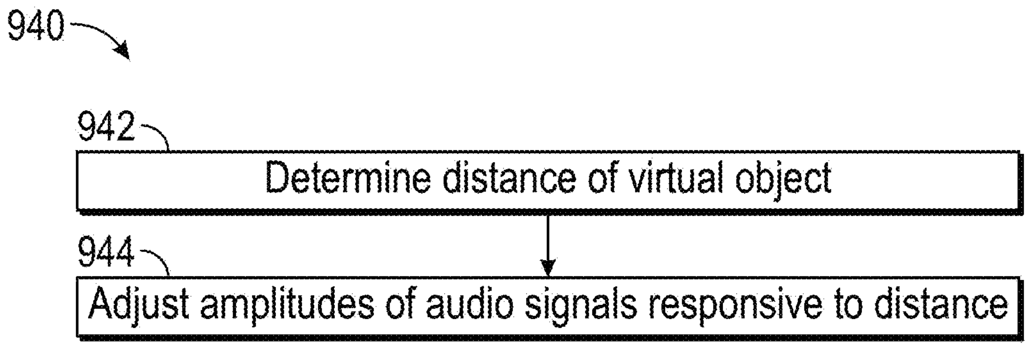
FIG. 9C is a flow chart listing steps in an example method of processing an audio track to add depth information.

FIG. 9C is a flow chart 940 listing the steps in an example method for adjusting amplitudes to produce audio signals corresponding to the distance of the virtual object with respect to the head of the user. The adjustments provide a more realistic audio experience that matches the visual interpretation by the user.

At block 942, the system determines the distance information of the virtual object with respect to the head of the user. The system determines the distance by monitoring the current position of the virtual object. In one example, the virtual object processing system 484 periodically (e.g., every 10 ms) calculates the current position of the virtual object (e.g., as described above with reference to block 904). The virtual object processing system 484 then calculates the distance between an origin associate with the head of the user and the current position of the virtual object.

At block 944, the system adjusts amplitudes of the left audio signal and the right audio signal responsive to the determined distance information. The processor 432 adjusts the amplitudes of the left audio signal and the right audio signal. In an example, the audio processing system 488 instructs the audio processor 413 to adjust the amplitude (e.g., increasing the amplitude when the distance is relatively close and increasing the amplitude when the distance is relatively far from the user). The audio processing system 488 may adjust the amplitudes by applying a conventional linear or non-linear algorithm.

The HRTF system 400 described above thus enables an electronic eyewear device 100 to immerse a user in an augmented reality environment where a large variable number of concurrent augmented reality objects (e.g., virtual lens objects) move around in a physical space. Each of these augmented reality objects may be associated with an audio sound track that moves with the augmented reality object using independent spatial audio post processing. To improve the user experience on an eyewear device 100, it is desired to provide the spatial audio processing using low power circuitry that provides a low audio playback latency without bounding the number of concurrent tracks. In a sample configuration, this may be accomplished by offloading the post-processing to the audio processor 413. For optimal latency performance, the number of remote procedure calls between the processor 432 and audio processor 413 should be minimized. The audio processing techniques described herein may be adapted to include the audio processor 413 with limited remote procedure calls by defining a new audio data format and associated encoding and decoding methods for transferring multiple channels of audio tracks from the processor 432 to the audio processor 413 for multi-channel audio processing. Such a configuration will be described with respect to FIGS. 11-14.

Figure 11:
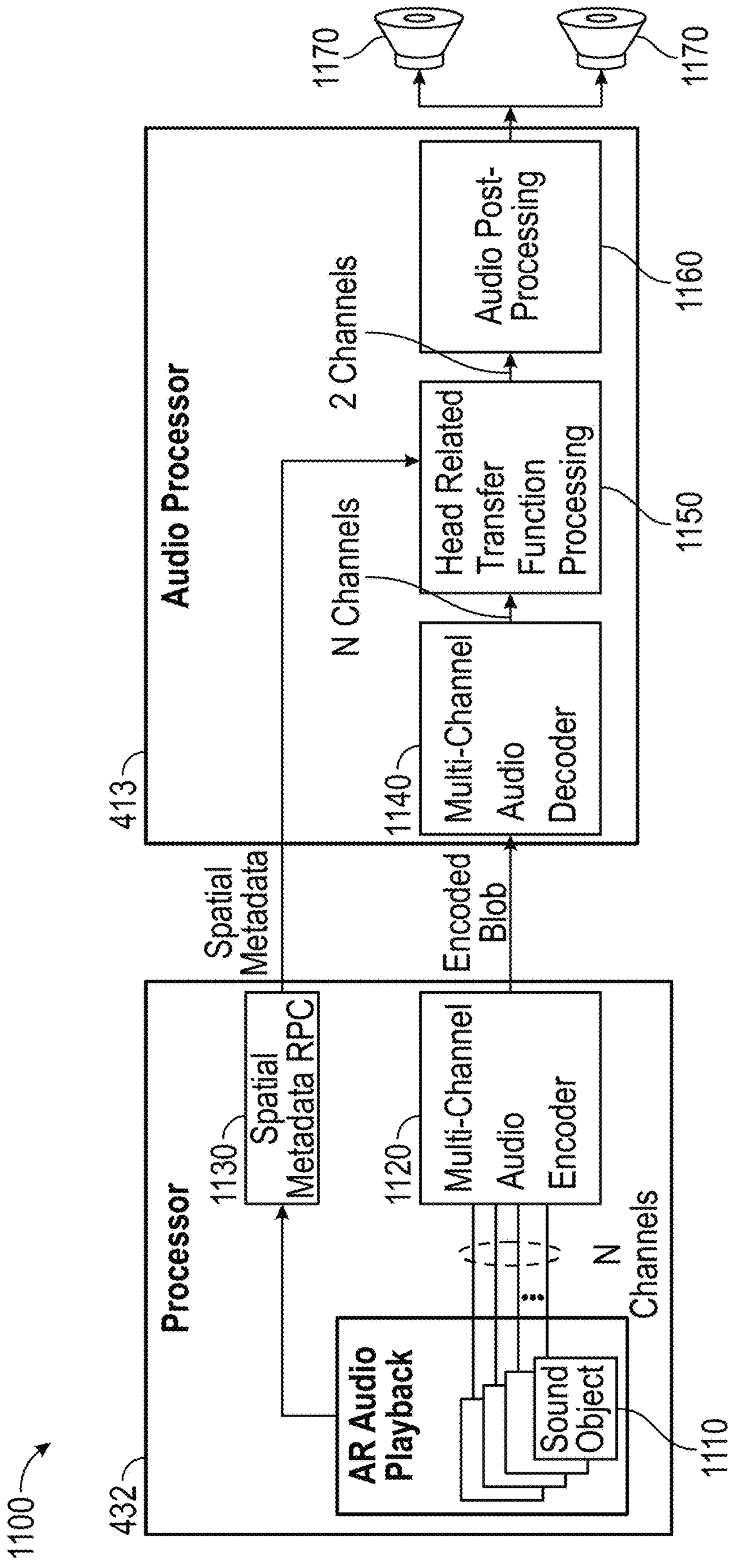
FIG. 11 is a schematic representation of a low latency, low power audio processing system including a multi-channel audio encoder and multi-channel audio decoder in a sample configuration.

FIG. 11 is a schematic representation of a low latency, low power audio processing system 1100 including a multi-channel audio encoder 1120 and multi-channel audio decoder 1140 in a sample configuration. As illustrated, the audio processing system 1100 includes processor 432 coupled to audio processor 413 that is also located on the electronic eyewear device 100 for providing enhanced audio processing capabilities.

In a sample configuration, the processor 432 receives the sound objects 1110 corresponding to the virtual objects loaded into the augmented reality module (e.g., Lens Studio available from Snap, Inc. of Santa Monica, California) during playback of the audio during presentation of the virtual objects. For example, if the flying saucer 1004 of FIG. 10 has a sound track for a whirring sound as the flying saucer 1004 flies through the user's environment 600, a sound object 1110 for the whirring sound is presented for playback. In the sample configuration, all such sound tracks for the sound objects 1110 associated with an augmented reality audio playback (e.g., N channels) are provided to the multi-channel audio encoder 1120 for encoding. Absent such encoding, a remote procedure call to the audio processor 413 would be required for each sound object 1110, which would adversely affect the system's audio processing latency. Accordingly, in sample configurations, the multi-channel audio encoder 1120 encodes the N-channel audio data so that the N-channels of audio data may be transferred with a single remote procedure call to the audio processor 413. The encoded audio data is decoded by the multi-channel audio decoder 1140 of the audio processor 413 to separate the encoded sound tracks for the respective virtual objects, and each sound track is provided to the head related transfer function (HRTF) processing module 1150 for associating the decoded sound track with the user's head position as described above. The HRTF processing includes processing of spatial metadata for the respective sound tracks. As shown, the spatial metadata for the respective sound objects 1110 may be sent asynchronously by a spatial metadata remote procedure call 1130 through a side channel between the processor 432 and the audio processor 413. The HRTF processing module 1150 converts the N channels of audio data into left/right audio channels for processing by post-processing module 1160 and presentation to left/right speakers 1170. In a sample configuration, the left/right speakers may correspond to left speaker 185A and right speaker 185B described above with respect to FIGS. 1-4.

Figure 12:
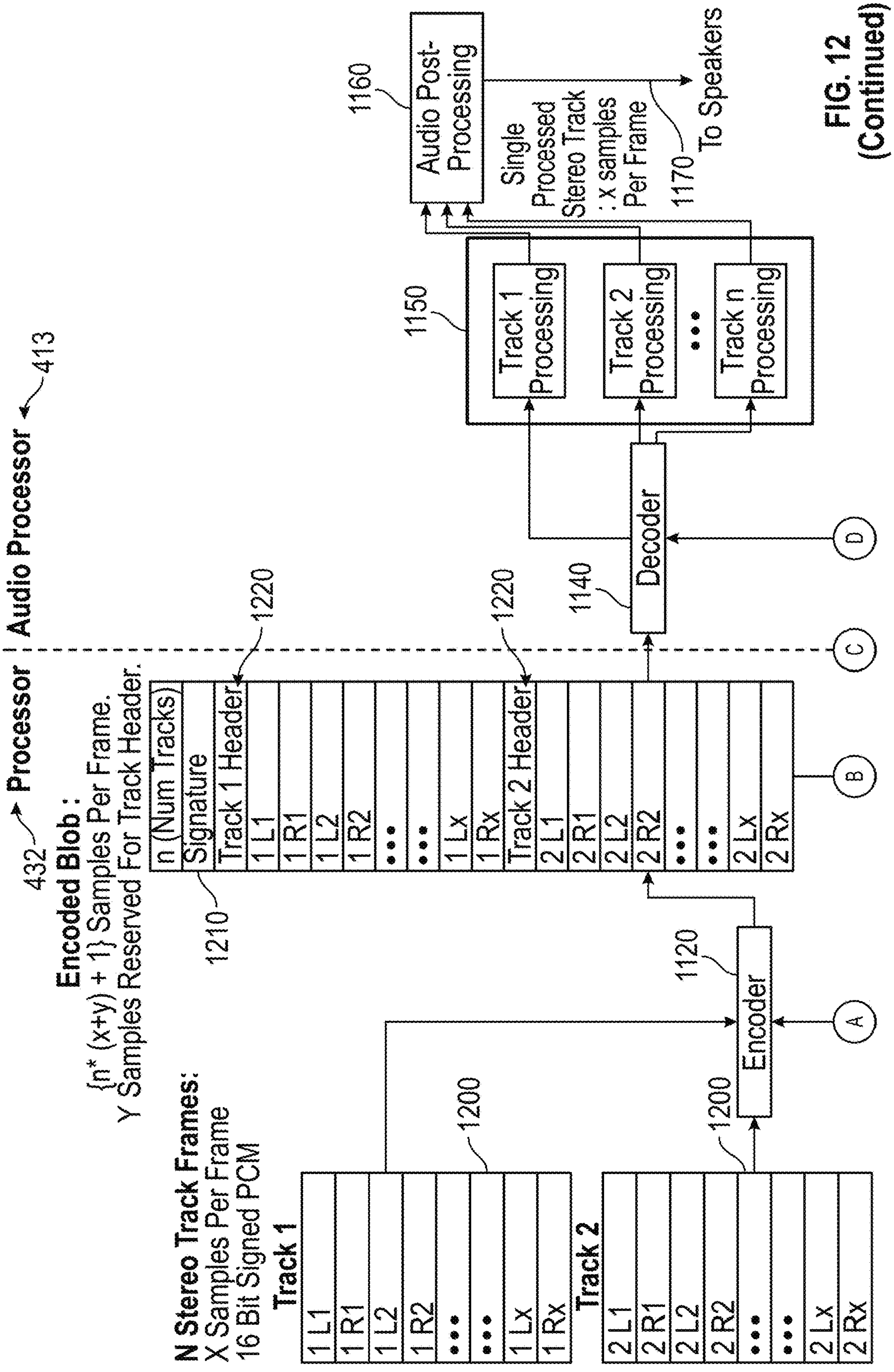
FIG. 12 illustrates the encoding of the multi-channel audio data by the multi-channel encoder in the sample configuration of FIG. 11.
Figure 12:
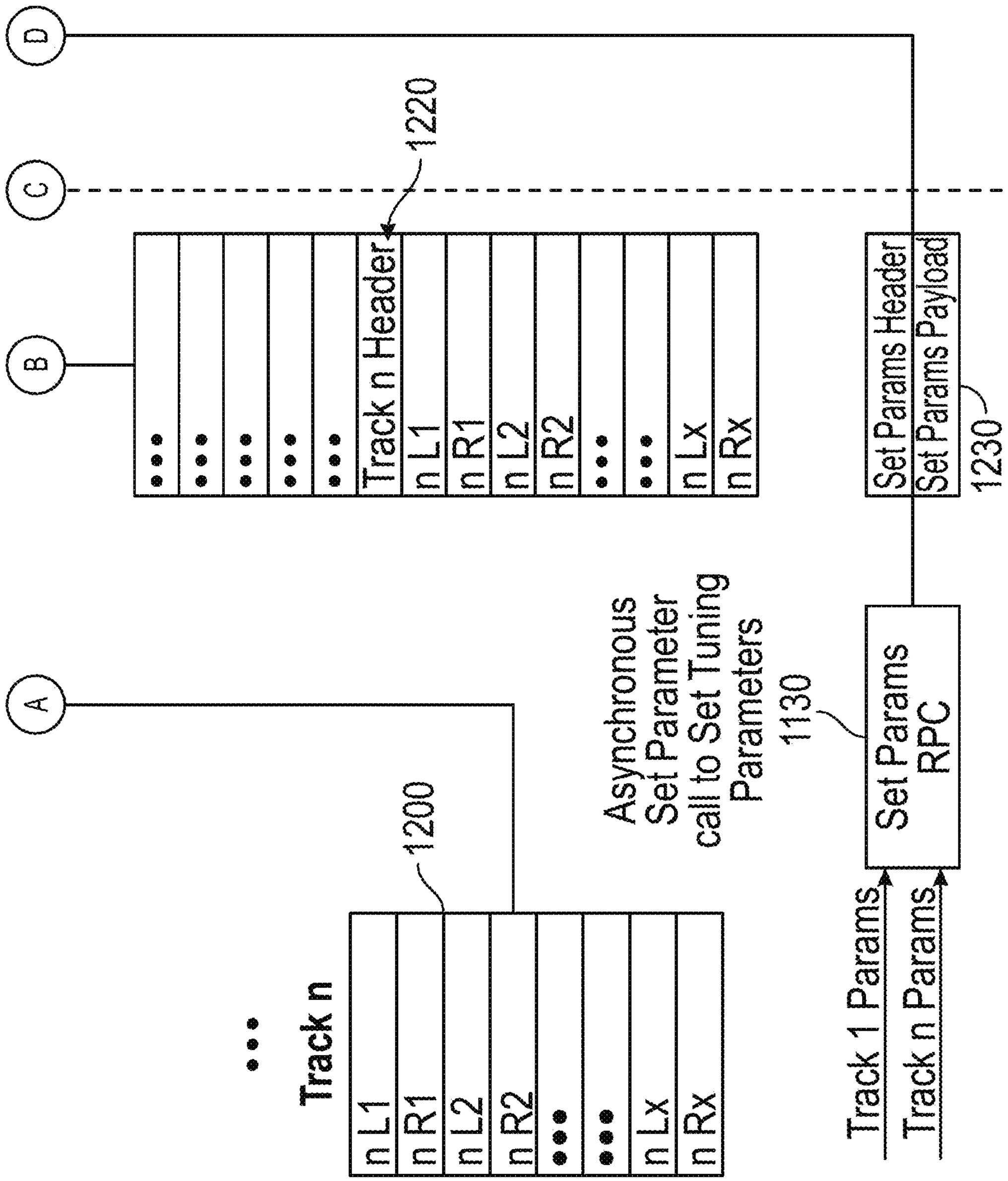

FIG. 12 illustrates the encoding of the multi-channel audio data by the multi-channel encoder 1120 in the sample configuration of FIG. 11. As illustrated, the multi-channel audio encoder 1120 of the processor 432 receives the respective audio tracks 1200 of the respective sound objects 1110 where each audio track 1200 has a frame with x samples per frame. In a sample configuration, the data may be presented as 16 bit signed pulse code modulated (PCM) audio data. However, it will be appreciated that the audio data may be in other formats such as MP3, advance audio coding (AAC), and the like. The respective audio tracks 1200 are provided to the multi-channel encoder 1120 for generation of an encoded blob including all provided audio tracks 1200 for transfer to the audio processor 413.

To facilitate the transfer to the audio processor 413 in a single remote procedure call, the multi-channel encoder 1120 aggregates the frames of each audio track 1200 and adds a header 1210 at the beginning of the combined track that indicates the number of tracks. Optionally, a signature (e.g., a unique ID) may also be provided to validate that the audio tracks 1200 are received from authorized sources (e.g., the multi-channel audio encoder 1120). The multi-channel encoder 1120 also adds samples at the beginning of each audio track 1200 including a custom header 1220 that contains information sufficient to enable the multi-channel audio decoder 1140 to unpackage the frame for each audio track 1200. The encoded blob including the header 1210 and aggregated headers 1220 and audio tracks 1200 is transferred to the audio processor 413 using, for example, a single remote procedure call.

The multi-channel audio decoder 1140 running on the audio processor 413 uses the header 1210 and respective custom headers 1220 to decode and split the audio tracks 1200 from the received encoded blob and dispatches each audio track 1200 to the HRTF processing module 1150 for independent processing. The HRTF processing module 1150 converts the N channels of audio tracks 1200 into two channels that are provided to the post-processing module 1160. A mixer of the audio post-processing module 1160 recombines the processed audio tracks 1200 into a single stereo track including x samples per frame for presentation to the speakers 1170.

The per-track tuning parameters, including spatial metadata relating to the positions of the virtual objects in space for the audio tracks 1200, also can be communicated asynchronously via one or more remote procedure calls 1130 via a dynamic side channel from the processor 432 to the HRTF processing module 1150 to enable the spatial processing by the HRTF processing module 1150. A header 1230 may be attached to the parameter data to identify the respective sound tracks 1200 to which the parameters are related. In the configuration of FIG. 12, the parameter data is sent to the audio processor 413 as a single block in parallel with the audio tracks 1200 to minimize processing latency.

It will be appreciated that the audio encoding format described above essentially allows packaging of frames of multiple audio tracks 1200 so that they can be treated by intermediary stock software (transport layers like a hardware abstraction layer (HAL), kernel, and remote procedure calls (RPCs)) as a frame consisting of samples of a single audio track (essentially a raw buffer of bytes). For example, in the above configuration, the frames of multiple audio tracks 1200 may be transferred to the audio processor 413 in a single RPC. The packaging also contains enough information so that the multi-channel audio decoder 1140 can unpackage the single track into raw frames for multiple audio tracks 1200 so that each audio track 1200 can be independently processed by custom processing modules such as the HRTF processing module 1150.

As noted above, the header 1210 for the encoded blob of a single frame that packages frames from each of N audio tracks 1200 may include the number of tracks (N) that are represented in the single frame of the encoded blob and, optionally, a signature (e.g., a unique ID) to validate that the audio tracks 1200 are received from authorized sources (e.g., the multi-channel audio encoder 1120).

Figure 13A:
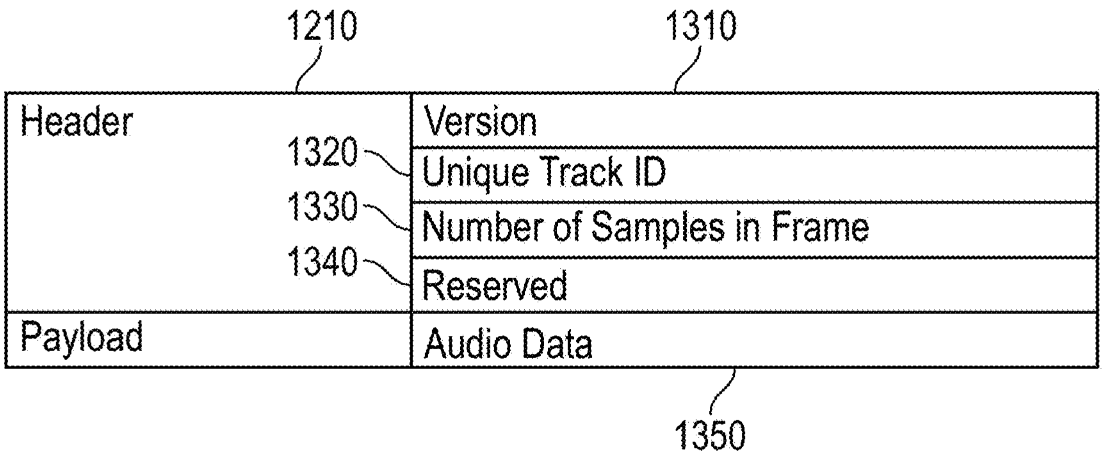
FIGS. 13A, 13B, and 13C illustrate sample headers in various embodiments of the audio processing system of FIGS. 11 and 12.
Figure 13B:
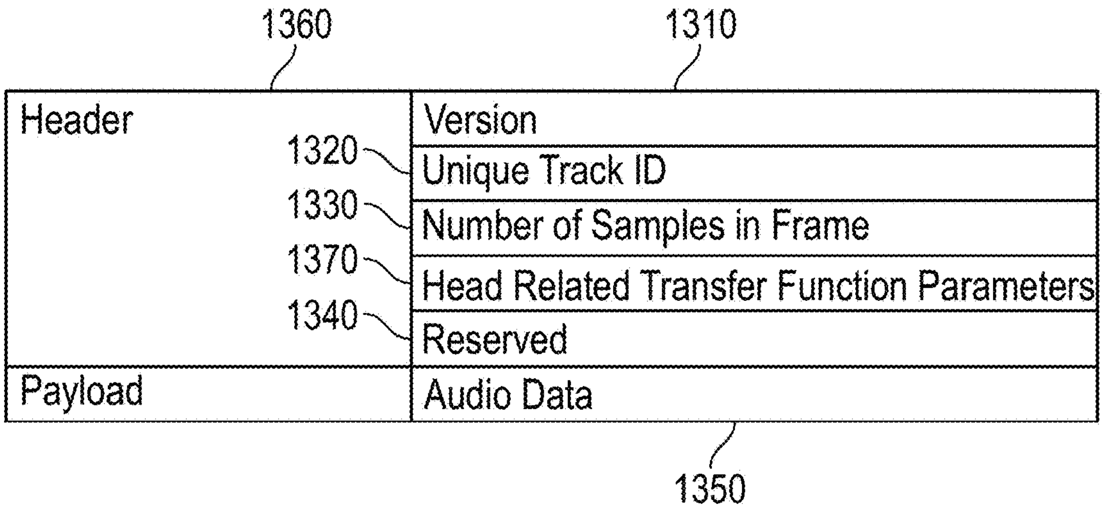
Figure 13C:
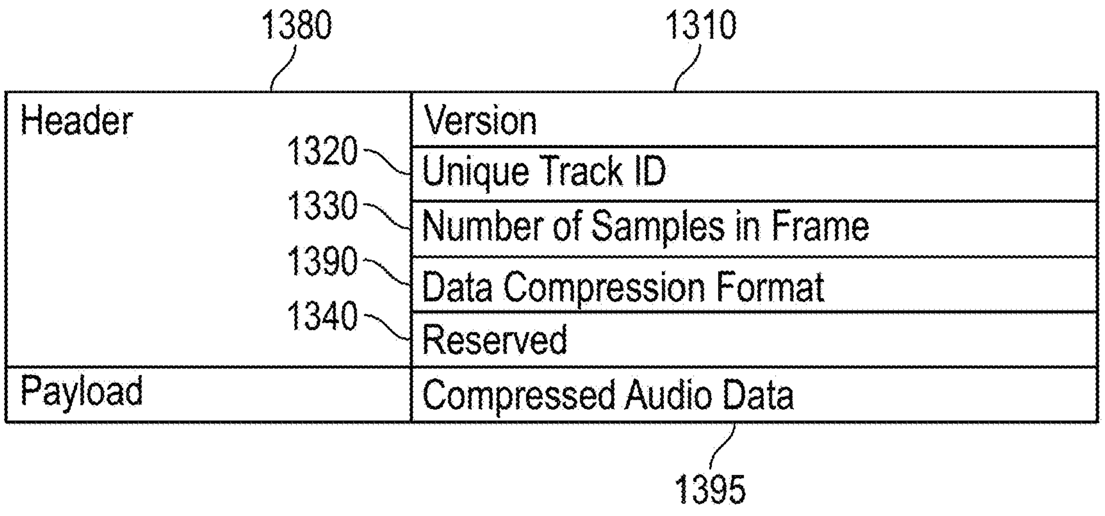

In sample configurations, custom headers 1220 may be created for each audio track 1200. FIGS. 13A, 13B, and 13C illustrate sample custom headers in various embodiments of the audio processing system of FIGS. 11 and 12.

FIG. 13A illustrates a sample header 1210 including the following representation of a frame from a single track:

- Header Version 1310 to ensure compatibility;
- Unique Track ID 1320 to help identify the audio track 1200 for spatial audio post processing tuning parameter changes as the virtual object moves in space;
- Number of samples 1330 in the frame; and
- Reserved fields 1340 for future use, such as timestamps for latency instrumentation.

The payload may include interleaved stereo samples for the frame of a single track of audio data 1350. In sample configurations, this format is repeated for each audio track 1200.

Also, the current HRTF parameters based on the current location of the virtual object may be sent via an asynchronous interface such as the afore-mentioned side channel. The side channel may implement, for example, a remote procedure call 1130 that combines the spatial parameters for all virtual objects into a single payload and transfers the payload to the HRTF processing module 1150 for spatial processing of the received audio tracks 1200. In sample configurations, the spatial parameters may include relative location, relative velocity of the virtual object as calculated using SLAM, intermediate objects in between, and the like.

FIGS. 13B and 13C illustrate variants of the sample header 1210.

In a first variation, the updated HRTF parameters and per-track tuning parameters may be provided synchronously with the audio tracks 1200. In this configuration, the side channel for the parameters would not be needed to communicate the current HRTF parameters and per-track tuning parameters to the HRTF processing module 1150. In this configuration, the HRTF parameters and per-track tuning parameters instead would be encoded with the audio tracks 1200 in the encoded blob. The sample header 1210 would be modified to account for the parameters. For example, as shown in FIG. 13B, HRTF parameters 1370 may be added to the header 1360 for the corresponding audio track 1200. The advantage of this variant is that accurate motion of the sound may be provided without software induced lag. In this variant, the HRTF parameters are communicated to the multi-channel audio encoder 1120 for each frame. If there is no change in the HRTF parameters, this can be communicated via a special signature in header 1210 or an individual header 1220. The multi-channel audio encoder 1120 may encode the HRTF parameters as part of the header 1360 for that track as shown in FIG. 13B. In this configuration, the multi-channel decoder 1140 may decode the HRTF parameters from the headers 1360 and provide the HRTF parameters to the HRTF processing module 1150 for application to the received audio tracks 1200 during the HRTF processing for that frame.

In the above configurations, it is assumed that the audio tracks 1200 are in a raw PCM uncompressed audio data format. However, the techniques described herein easily can be extended to compressed audio data formats (e.g., AAC, MP3, etc.) where the audio decoding is done either on the processor 432 or the audio processor 413. In the case where the audio decoding is performed by the audio processor 413, the multi-channel audio encoder 1120 would send the compressed audio data in the payload of the respective audio tracks 1200 and modify the header to identify the type of compression that has been applied. For example, as shown in FIG. 13C, the data compression format 1390 may be provided in the header 1380 and the compressed audio data 1395 provided in the payload. In this configuration, the multi-channel audio decoder 1140 may decompress the audio data using the data decompression module dictated by the data compression format 1390 in the header 1380. The multi-channel decoder 1140 will also act as a dispatcher to the HRTF processing module 1150 for the decompressed individual audio tracks 1200.

Figure 14:
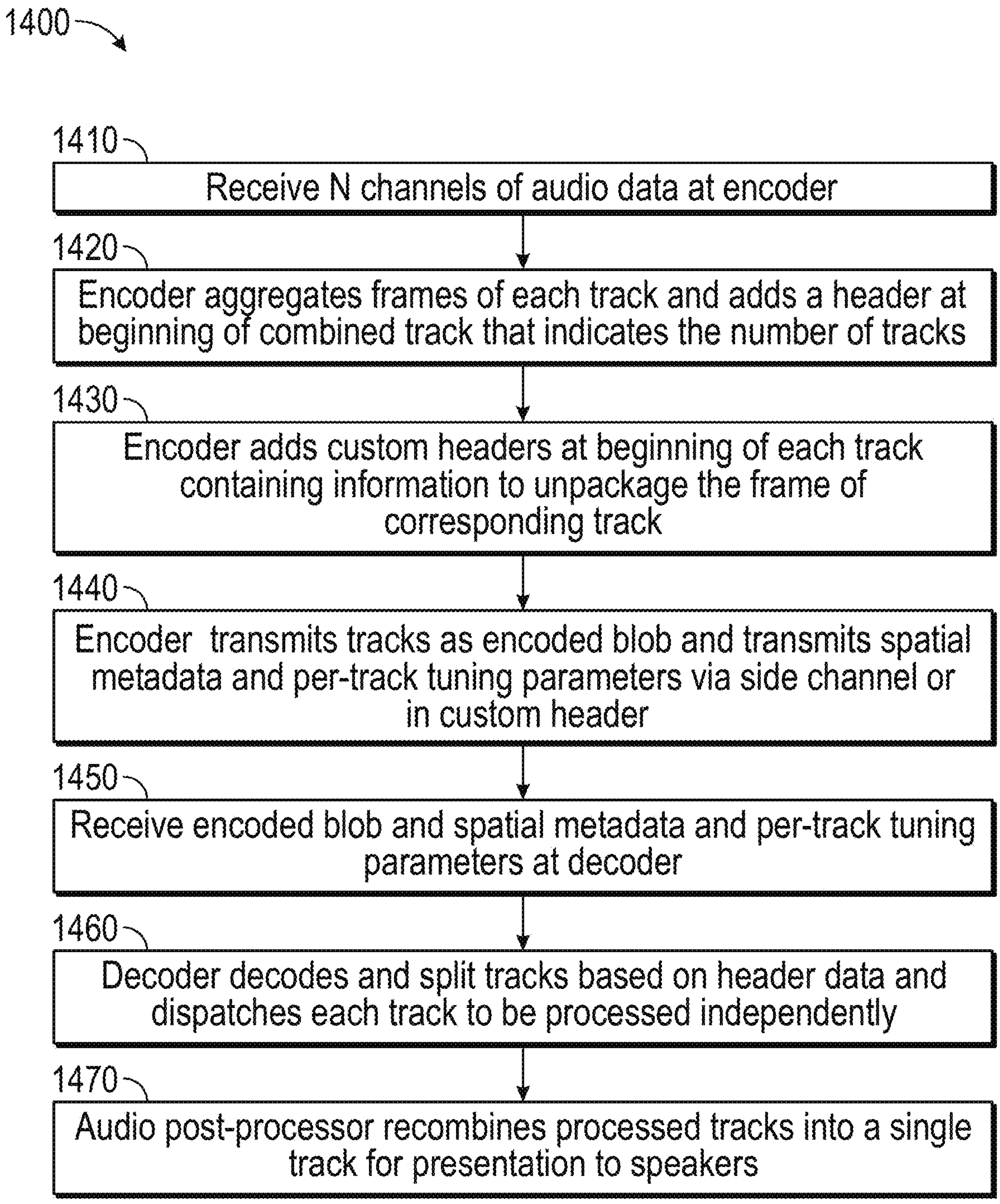
FIG. 14 is a flow chart listing steps in a sample method of encoding and decoding multi-channel audio data in the sample configuration of FIGS. 11 and 12.

FIG. 14 is a flow chart listing steps in a sample method 1400 of encoding and decoding multi-channel audio data in the sample configuration of FIGS. 11 and 12.

In the method 1400, the multi-channel audio encoder 1120 receives at 1410 the sound objects 1110 corresponding to the virtual objects loaded into the augmented reality module (e.g., Lens Studio available from Snap, Inc. of Santa Monica, California) during playback of the N-channels of audio for the N sound objects 1110 during presentation of the virtual objects.

At 1420, the multi-channel audio encoder 1120 aggregates the frames of each track and adds a header 1210 at the beginning of the combined audio track that indicates the number of aggregated tracks. Optionally, a signature (e.g., a unique ID) may also be provided to validate that the audio tracks 1200 are received from authorized sources (e.g., the multi-channel audio encoder 1120).

At 1430, the multi-channel audio encoder 1120 adds custom headers (e.g., FIGS. 13A, 13B, 13C) at the beginning of each audio track 1200 containing information sufficient to enable the multi-channel audio decoder 1140 to unpackage the frame of the corresponding audio track 1200.

At 1440, the multi-channel audio encoder 1120 transmits the aggregated audio tracks 1200 as an encoded blob (e.g., in a single RPC) and transmits the HRTF spatial encoding parameter metadata and per-track tuning parameters via the side channel or in the custom header to the multi-channel audio decoder 1140.

At 1450, the multi-channel audio decoder 1140 receives the encoded blob and HRTF spatial encoding parameter metadata and per-track tuning parameters.

At 1460, the encoded audio data is decoded by the multi-channel audio decoder 1140 to separate the encoded audio tracks 1200 for the respective virtual objects based on the header data, and each audio track 1200 is dispatched to the HRTF processing module 1150 for associating the decoded audio tracks 1200 with the user's head position. As described above, the HRTF processing module 1150 converts the N channels of audio data into left/right audio channels.

Finally, at 1470, the left/right audio channels are provided to the post-processing module 1160 to recombine the processed tracks into single stereo track for presentation to left/right speakers 1170.

Those skilled in the art will appreciate that other modifications are possible within the scope of the present disclosure. For example, it will be appreciated that the audio tracks 1200 may not arrive at the same time but may arrive asynchronously to the multi-channel audio encoder 1120. In such a case, the audio tracks 1200 may be acquired by the multi-channel audio encoder 1120 at a sampling interval or may be scheduled for delivery to the multi-channel audio encoder 1120 for encoding. In such a case, timing or scheduling data may be provided in the header 1210 or the customer headers 1220 to enable regeneration of the asynchronously received audio tracks 1200 at the audio processor 413. Also, it will be appreciated by those skilled in the art that any of the audio tracks 1200 may be in mono or stereo. In such a case, another field may be appended to the header 1220 to indicate the number of channels in a given audio track.

Any of the functionality described herein for the eyewear device 100, the mobile device 401, and the server system 498 can be embodied in one or more computer software applications or sets of programming instructions, as described herein. According to some examples, "function," "functions," "application," "applications," "instruction," "instructions," or "programming" are program(s) that execute functions defined in the programs. Various programming languages can be employed to develop one or more of the applications, structured in a variety of manners, such as object-oriented programming languages (e.g., Objective-C, Java, or C++) or procedural programming languages (e.g., C or assembly language). In a specific example, a third-party application (e.g., an application developed using the ANDROID™ or IOS™ software development kit (SDK) by an entity other than the vendor of the particular platform) may include mobile software running on a mobile operating system such as IOS™, ANDROID™, WINDOWS® Phone, or another mobile operating systems. In this example, the third-party application can invoke API calls provided by the operating system to facilitate functionality described herein.

Hence, a machine-readable medium may take many forms of tangible storage medium. Non-volatile storage media include, for example, optical or magnetic disks, such as any of the storage devices in any computer devices or the like, such as may be used to implement the client device, media gateway, transcoder, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code or data. Many of these forms of computer readable media may be involved in carrying one or more sequences of one or more instructions to a processor for execution.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that comprises the element.

Unless otherwise stated, any and all measurements, values, ratings, positions, magnitudes, sizes, and other specifications that are set forth in this specification, including in the claims that follow, are approximate, not exact. Such amounts are intended to have a reasonable range that is consistent with the functions to which they relate and with what is customary in the art to which they pertain. For example, unless expressly stated otherwise, a parameter value or the like may vary by as much as plus or minus ten percent from the stated amount or range.

In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, the subject matter to be protected lies in less than all features of any single disclosed example. Thus, the following claims are hereby incorporated into the Detailed Description, with each claim standing on its own as a separately claimed subject matter.

While the foregoing has described what are considered to be the best mode and other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:

1. An electronic eyewear device configured to present augmented reality objects to a user, comprising:

a display that presents augmented reality objects in a scene being viewed by the user;

a speaker system including a first speaker for presenting a left audio signal to a left ear of a head of the user and a second speaker for presenting a right audio signal to a right ear of the head of the user;

a memory storing instructions; and an audio processing system including a processor and an audio processor that together process the instructions to present audio associated with the augmented reality objects to the speaker system, wherein:

the processor asynchronously receives one or more audio tracks respectively associated with one or more augmented reality objects, samples the asynchronously received audio tracks at a sampling interval or receives the asynchronously received audio tracks at a scheduled delivery interval, encodes the one or more audio tracks into an aggregated audio track including the one or more audio tracks, provides a header for each audio track that uniquely identifies each respective audio track and includes timing or scheduling data for the asynchronous received audio tracks, provides an aggregate header that identifies the number of audio tracks in the aggregated audio track, and transfers the aggregated audio track to the audio processor in a first data transmission channel; and the audio processor uses the header for each audio track and the aggregate header to separate the one or more audio tracks from the aggregated audio track, processes the one or more audio tracks independently in parallel, and provides the one or more audio tracks to the speaker system for presentation with the augmented reality objects.

2. The electronic eyewear device of claim 1, wherein a unique identifier is provided with the audio tracks to validate a source of the asynchronously received audio tracks.

3. The electronic eyewear device of claim 1, wherein the processor further receives spatial parameter metadata relating to at least one of the one or more audio tracks, aggregates the spatial parameter metadata into aggregated spatial parameter metadata, and transfers the aggregated spatial parameter metadata to the audio processor asynchronously with respect to the aggregated audio track in a second data transmission channel.

4. The electronic eyewear device of claim 3, wherein the audio processor comprises a head related transfer function processing module that separates the spatial parameter metadata corresponding to respective audio tracks from the aggregated spatial parameter data and processes the one or more audio tracks and spatial parameter metadata associated with the one or more audio tracks to produce the left audio signal and the right audio signal, wherein the left audio signal and the right audio signal present sounds associated with spatial positions of the augmented reality objects in the scene.

5. The electronic eyewear device of claim 1, wherein the processor further receives spatial parameter metadata relating to at least one of the one or more audio tracks and per-track tuning parameters synchronously with the one or more audio tracks.

6. The electronic eyewear device of claim 5, wherein the spatial parameter metadata and per-track tuning parameters are encoded by the processor with the one or more audio tracks in the aggregated audio track.

7. The electronic eyewear device of claim 6, wherein the header includes spatial parameter data for a corresponding audio track.

8. The electronic eyewear device of claim 7, wherein the spatial parameter data is communicated to the processor for each frame for the respective audio track.

9. The electronic eyewear device of claim 8, wherein when there is no change in the spatial parameter data between frames, a special signature is provided in the header or in an individual header.

10. The electronic eyewear device of claim 1, at least one of the one or more audio tracks is in mono or stereo and another field is appended to the header to indicate a number of channels in the at least one of the one or more audio tracks.

11. The electronic eyewear device of claim 1, wherein the processor transfers the aggregated audio track to the audio processor using a single remote procedure call.

12. The electronic eyewear device of claim 1, wherein the header for a respective audio track further comprises an indication of a version of the header and a number of samples in a frame for the respective audio track.

13. The electronic eyewear device of claim 1, wherein at least one of the one or more audio tracks is compressed, and the header for each respective compressed audio track further comprises an indication of the type of compression that has been applied to the one or more compressed audio tracks.

14. A method for presenting sounds associated with augmented reality objects presented to a user in a scene, comprising:

a processor asynchronously receiving audio tracks respectively associated with augmented reality objects;

the processor sampling the asynchronously received audio tracks at a sampling interval or receiving the asynchronously received audio tracks at a scheduled delivery interval;

the processor encoding the audio tracks into an aggregated audio track including the audio tracks, a header for each audio track that uniquely identifies each respective audio track and includes timing or scheduling data for the asynchronously received audio tracks, and an aggregate header that identifies the number of audio tracks in the aggregated audio track;

the processor transferring the aggregated audio track to an audio processor in a first data transmission channel;

the audio processor using the header for each audio track and the aggregate header to separate the audio tracks from the aggregated audio track;

the audio processor processing the audio tracks independently in parallel; and the audio processor providing the audio tracks to a speaker system for presentation with the augmented reality objects.

15. The method of claim 14, further comprising providing a unique identifier with the audio tracks to validate a source of the asynchronously received audio tracks.

16. The method of claim 14, further comprising the processor further receiving spatial parameter metadata relating to at least one of the audio tracks, aggregating the spatial parameter metadata into aggregated spatial parameter metadata, and transferring the aggregated spatial parameter metadata to the audio processor asynchronously with respect to the aggregated audio track in a second data transmission channel.

17. The method of claim 16, further comprising the audio processor separating the spatial parameter metadata corresponding to respective audio tracks from the aggregated spatial parameter data and processing the audio tracks and spatial parameter metadata associated with the audio tracks to produce a left audio signal and a right audio signal, the left audio signal and the right audio signal presenting sounds associated with spatial positions of the augmented reality objects in the scene.

18. The method of claim 14, further comprising the processor receiving spatial parameter metadata relating to at least one of the audio tracks and per-track tuning parameters synchronously with the audio tracks and encoding the spatial parameter metadata and per-track tuning parameters with the audio tracks in the aggregated audio track.

19. The method of claim 18, wherein the header includes spatial parameter data for a corresponding audio track, further comprising communicating the spatial parameter data to the processor for each frame for the respective audio track and, when there is no change in the spatial parameter data between frames, providing a special signature in the header or in an individual header.

20. A non-transitory computer readable medium including instructions for presenting sounds associated with augmented reality objects presented to a user in a scene, wherein the instructions, when performed by a processor and audio processor, configure the processor and audio processor to:

asynchronously receive, by a processor, audio tracks respectively associated with augmented reality objects;

sample, by the processor, the asynchronously received audio tracks at a sampling interval or receiving the asynchronously received audio tracks at a scheduled delivery interval;

encode, by the processor, the audio tracks into an aggregated audio track including the audio tracks, a header for each audio track that uniquely identifies each respective audio track and includes timing or scheduling data for the asynchronously received audio tracks, and an aggregate header that identifies the number of audio tracks in the aggregated audio track;

transfer, by the processor, the aggregated audio track to an audio processor in a first data transmission channel;

separate, by the audio processor, the audio tracks from the aggregated audio track using the header for each audio track and the aggregate header;

process, by the audio processor, the audio tracks independently in parallel; and provide, by the audio processor, the audio tracks to a speaker system for presentation with the augmented reality objects.

* * * * *